(12) United States Patent
Kozlowski et al.

(10) Patent No.: US 11,748,765 B2
(45) Date of Patent: Sep. 5, 2023

(54) ASSISTANCE ON THE GO

(71) Applicant: Allstate Insurance Company, Northbrook, IL (US)

(72) Inventors: Tara Cavallaro Kozlowski, Geneva, IL (US); Ryan M. Briggs, Glen Ellyn, IL (US); Imran Iqbal, Hoffman Estates, IL (US)

(73) Assignee: Allstate Insurance Company, Northbrook, IL (US)

( * ) Notice: Subject to any disclaimer, the term of this patent is extended or adjusted under 35 U.S.C. 154(b) by 65 days.

(21) Appl. No.: 17/191,198

(22) Filed: Mar. 3, 2021

(65) Prior Publication Data

US 2021/0192537 A1 Jun. 24, 2021

Related U.S. Application Data

(63) Continuation of application No. 16/148,522, filed on Oct. 1, 2018, now Pat. No. 10,997,605, which is a (Continued)

(51) Int. Cl.
*G06Q 30/016* (2023.01)
*H04W 4/70* (2018.01)
(Continued)

(52) U.S. Cl.
CPC ......... *G06Q 30/016* (2013.01); *G06F 3/0482* (2013.01); *G06F 3/04817* (2013.01); *G06F 3/04842* (2013.01); *G06Q 20/388* (2013.01); *G06Q 30/0251* (2013.01); *G06Q 40/08* (2013.01); *G07C 5/008* (2013.01); *G07F 7/0833* (2013.01); *G07F 7/1008* (2013.01); *G08G 1/0967* (2013.01); *H04L 67/10* (2013.01); *H04L 67/12* (2013.01); *H04M 3/487* (2013.01);
(Continued)

(58) Field of Classification Search
CPC .................................................... G06Q 30/016
See application file for complete search history.

(56) References Cited

U.S. PATENT DOCUMENTS

D426,206 S    6/2000  Richter
D434,419 S    11/2000 Bomze et al.
(Continued)

FOREIGN PATENT DOCUMENTS

CN    101252627 A    8/2008
EP    1320004 A1     6/2003

OTHER PUBLICATIONS

Jul. 25, 2012—U.S. Non-Final Office Action—U.S. Appl. No. 12/859,627.
(Continued)

*Primary Examiner* — Michael A Berns
(74) *Attorney, Agent, or Firm* — Polsinelli PC

(57) ABSTRACT

A mobile computerized apparatus configured to provide membership status in a roadside assistance program after occurrence of a roadside event is disclosed. The apparatus executes instructions that cause/allow the apparatus to receive input related to an electronic membership card, retrieve from a data store membership information associated with the vehicle, and dynamically update the electronic membership card for display on the apparatus.

20 Claims, 11 Drawing Sheets

Related U.S. Application Data continuation of application No. 15/258,312, filed on Sep. 7, 2016, now Pat. No. 10,121,148, which is a continuation of application No. 14/721,689, filed on May 26, 2015, now Pat. No. 9,466,061, which is a continuation of application No. 12/859,627, filed on Aug. 19, 2010, now Pat. No. 9,070,243.

(60) Provisional application No. 61/255,349, filed on Oct. 27, 2009, provisional application No. 61/235,217, filed on Aug. 19, 2009.

(51) Int. Cl.
| | |
|---|---|
| *H04W 4/029* | (2018.01) |
| *H04W 4/44* | (2018.01) |
| *G07C 5/00* | (2006.01) |
| *H04M 3/487* | (2006.01) |
| *H04W 4/021* | (2018.01) |
| *G07F 7/10* | (2006.01) |
| *G08G 1/0967* | (2006.01) |
| *G06F 3/04817* | (2022.01) |
| *G06F 3/0482* | (2013.01) |
| *G06F 3/04842* | (2022.01) |
| *G06Q 20/38* | (2012.01) |
| *G06Q 40/08* | (2012.01) |
| *H04L 67/10* | (2022.01) |
| *H04L 67/12* | (2022.01) |
| *H04W 84/12* | (2009.01) |
| *G06Q 30/0251* | (2023.01) |
| *G07F 7/08* | (2006.01) |
| *H04W 4/02* | (2018.01) |
| *G08G 1/00* | (2006.01) |

(52) U.S. Cl.
CPC .............. *H04W 4/02* (2013.01); *H04W 4/021* (2013.01); *H04W 4/029* (2018.02); *H04W 4/44* (2018.02); *H04W 4/70* (2018.02); *H04W 84/12* (2013.01); *G08G 1/205* (2013.01); *H04M 2201/38* (2013.01); *H04M 2207/18* (2013.01)

(56) References Cited

U.S. PATENT DOCUMENTS

| | | | |
|---|---|---|---|
| 6,233,563 B1 | 5/2001 | Jefferson et al. | |
| 6,298,229 B1 | 10/2001 | Tomlinson, Jr. et al. | |
| D453,767 S | 2/2002 | Istvan et al. | |
| 6,415,226 B1 | 7/2002 | Kozak | |
| D464,660 S | 10/2002 | Weng et al. | |
| 6,493,629 B1 | 12/2002 | Van Bosch | |
| 6,522,265 B1 | 2/2003 | Hillman et al. | |
| D474,479 S | 5/2003 | Tambata | |
| D474,780 S | 5/2003 | Tambata | |
| D475,719 S | 6/2003 | Horie | |
| 6,677,854 B2 | 1/2004 | Dix | |
| 6,726,107 B1 | 4/2004 | Ruth | |
| 6,745,153 B2 | 6/2004 | White et al. | |
| D495,338 S | 8/2004 | Peter et al. | |
| 6,771,742 B2 | 8/2004 | McCalmont et al. | |
| 6,847,825 B1 | 1/2005 | Duvall et al. | |
| D517,087 S | 3/2006 | Sands | |
| 7,012,993 B2 | 3/2006 | Alton | |
| 7,024,205 B1 | 4/2006 | Hose | |
| 7,027,808 B2 | 4/2006 | Wesby | |
| D522,015 S | 5/2006 | Cummins et al. | |
| D523,442 S | 6/2006 | Hiramatsu | |
| 7,068,994 B2 | 6/2006 | Van Camp | |
| 7,091,903 B2 | 8/2006 | Kim | |
| 7,092,695 B1 | 8/2006 | Boling et al. | |
| 7,099,835 B2 | 8/2006 | Williams, III | |
| D529,507 S | 10/2006 | Cummins | |
| D529,510 S | 10/2006 | Cummins et al. | |
| 7,119,669 B2 | 10/2006 | Lundsgaard et al. | |
| 7,130,406 B2 | 10/2006 | Pines et al. | |
| 7,142,959 B2 | 11/2006 | Oesterling et al. | |
| 7,155,335 B2 | 12/2006 | Rennels | |
| 7,167,796 B2 | 1/2007 | Taylor et al. | |
| 7,174,243 B1 | 2/2007 | Lightner et al. | |
| 7,215,965 B2 | 5/2007 | Fournier et al. | |
| D544,871 S | 6/2007 | Lim et al. | |
| 7,236,576 B2 | 6/2007 | Schnarel et al. | |
| 7,242,966 B1 | 7/2007 | Averkamp | |
| D550,689 S | 9/2007 | Vigesaa | |
| 7,266,435 B2 | 9/2007 | Wang et al. | |
| D553,146 S | 10/2007 | Byeon et al. | |
| 7,289,786 B2 | 10/2007 | Krasner | |
| D556,770 S | 12/2007 | O'Donnell et al. | |
| D560,226 S | 1/2008 | Jung et al. | |
| 7,323,973 B1 | 1/2008 | Ceglia et al. | |
| D561,191 S | 2/2008 | Haning et al. | |
| 7,336,172 B2 | 2/2008 | Govindaraj | |
| D563,975 S | 3/2008 | Vigesaa | |
| D564,541 S | 3/2008 | Lettau et al. | |
| 7,343,565 B2 | 3/2008 | Ying et al. | |
| D565,581 S | 4/2008 | Gunn et al. | |
| 7,389,244 B2 | 6/2008 | Kaplan | |
| 7,405,537 B2 | 7/2008 | Hoffman et al. | |
| D574,842 S | 8/2008 | Kwag et al. | |
| D575,302 S | 8/2008 | Millar et al. | |
| 7,421,321 B2 | 9/2008 | Breed et al. | |
| D578,134 S | 10/2008 | Jasinski | |
| D579,946 S | 11/2008 | Lee et al. | |
| 7,457,693 B2 | 11/2008 | Olsen et al. | |
| 7,460,019 B2 | 12/2008 | Henderson | |
| 7,463,951 B2 | 12/2008 | Ampunan et al. | |
| 7,480,546 B2 | 1/2009 | Kamdar et al. | |
| D586,355 S | 2/2009 | Mori et al. | |
| 7,486,222 B2 * | 2/2009 | Matsuoka | G01S 7/4004 343/872 |
| 7,487,111 B2 | 2/2009 | Shoen et al. | |
| 7,499,714 B2 | 3/2009 | Ki | |
| D592,223 S | 5/2009 | Neuhaus | |
| D593,110 S | 5/2009 | Danton | |
| D593,111 S | 5/2009 | Danton | |
| D594,465 S | 6/2009 | Hong et al. | |
| D594,468 S | 6/2009 | Bamford et al. | |
| 7,593,855 B1 | 9/2009 | Craig | |
| 7,602,388 B2 | 10/2009 | Plut | |
| D605,657 S | 12/2009 | Danton | |
| D607,464 S | 1/2010 | Tang et al. | |
| D608,366 S | 1/2010 | Matas | |
| D611,056 S | 3/2010 | Langlois et al. | |
| D618,249 S | 6/2010 | Ahn et al. | |
| D618,696 S | 6/2010 | Woods et al. | |
| D618,700 S | 6/2010 | Song | |
| D618,702 S | 6/2010 | Lee | |
| D621,849 S | 8/2010 | Anzures et al. | |
| D623,555 S | 9/2010 | Reithlingshoefer et al. | |
| D624,556 S | 9/2010 | Chaudhri | |
| D624,589 S | 9/2010 | Robbins | |
| 7,802,722 B1 | 9/2010 | Papiemiak et al. | |
| D625,312 S | 10/2010 | Jewitt et al. | |
| 7,813,980 B2 | 10/2010 | Crockett | |
| D631,889 S | 2/2011 | Vance et al. | |
| D642,194 S | 7/2011 | Kozlowski et al. | |
| D642,589 S | 8/2011 | Kozlowski et al. | |
| D645,051 S | 9/2011 | Kozlowski et al. | |
| 8,140,358 B1 | 3/2012 | Ling et al. | |
| 8,285,571 B2 | 10/2012 | Demirdjian et al. | |
| 8,289,171 B2 | 10/2012 | Morley | |
| 8,290,705 B2 | 10/2012 | Trinko et al. | |
| 8,315,792 B2 | 11/2012 | Speier et al. | |
| 8,415,226 B2 | 4/2013 | Kochupurackal et al. | |
| 8,515,673 B2 | 8/2013 | Trinko et al. | |
| 8,606,512 B1 | 12/2013 | Bogovich et al. | |
| 8,645,014 B1 | 2/2014 | Kozlowski et al. | |
| 8,750,902 B2 | 6/2014 | Xiao et al. | |
| 8,781,657 B2 | 7/2014 | Pebbles | |
| 8,799,034 B1 | 8/2014 | Brandmaier et al. | |
| 8,805,603 B1 | 8/2014 | Cavallaro Kozlowski et al. | |

(56) References Cited

U.S. PATENT DOCUMENTS

| | | | |
|---|---|---|---|
| 8,805,707 | B2 | 8/2014 | Schumann, Jr. et al. |
| 9,384,491 | B1 | 7/2016 | Briggs et al. |
| 9,406,228 | B1 | 8/2016 | Kozlowski et al. |
| 9,412,130 | B2 | 8/2016 | Wasserman et al. |
| 9,466,061 | B1 | 10/2016 | Kozlowski et al. |
| 9,659,301 | B1 | 5/2017 | Briggs et al. |
| 9,684,924 | B2 | 6/2017 | Wasserman et al. |
| 9,697,525 | B1 | 7/2017 | Kozlowski et al. |
| 9,881,268 | B1 | 1/2018 | Briggs et al. |
| 10,032,228 | B2 | 7/2018 | Wasserman et al. |
| 10,121,148 | B1 * | 11/2018 | Kozlowski ............ H04W 4/70 |
| 10,382,900 | B1 * | 8/2019 | Briggs ................ H04W 4/44 |
| 10,410,148 | B1 * | 9/2019 | Briggs ................ H04M 3/487 |
| 10,453,011 | B1 | 10/2019 | Briggs et al. |
| 10,553,119 | B1 * | 2/2020 | Shah ................ G06N 3/08 |
| 10,600,127 | B1 | 3/2020 | Wasserman et al. |
| 10,997,605 | B1 * | 5/2021 | Kozlowski ........ G06Q 30/016 |
| 11,132,629 | B2 * | 9/2021 | Gara ................ G06Q 10/06 |
| 2002/0055861 | A1 | 5/2002 | King et al. |
| 2002/0065703 | A1 | 5/2002 | Garg |
| 2002/0073012 | A1 | 6/2002 | Lowell et al. |
| 2002/0096561 | A1 | 7/2002 | Sullivan |
| 2002/0184653 | A1 | 12/2002 | Pierce et al. |
| 2003/0088347 | A1 | 5/2003 | Ames |
| 2004/0024711 | A1 | 2/2004 | Camping et al. |
| 2004/0100479 | A1 | 5/2004 | Nakano et al. |
| 2004/0111195 | A1 | 6/2004 | Vries et al. |
| 2004/0192336 | A1 | 9/2004 | Walby |
| 2004/0203850 | A1 | 10/2004 | Oesterling |
| 2004/0221239 | A1 | 11/2004 | Hachigian et al. |
| 2005/0027438 | A1 | 2/2005 | Rockett et al. |
| 2005/0071052 | A1 | 3/2005 | Coletrane et al. |
| 2005/0091272 | A1 | 4/2005 | Smith et al. |
| 2005/0187833 | A1 | 8/2005 | Royer et al. |
| 2005/0197771 | A1 | 9/2005 | Seick et al. |
| 2005/0261986 | A1 | 11/2005 | Haynes et al. |
| 2006/0022846 | A1 | 2/2006 | Tummala |
| 2006/0123360 | A1 | 6/2006 | Anwar et al. |
| 2006/0245570 | A1 | 11/2006 | Pfleging et al. |
| 2006/0247852 | A1 | 11/2006 | Kortge et al. |
| 2006/0291633 | A1 | 12/2006 | Glaza et al. |
| 2007/0011278 | A1 | 1/2007 | Nou |
| 2007/0033540 | A1 | 2/2007 | Bridges et al. |
| 2007/0066276 | A1 | 3/2007 | Kuz et al. |
| 2007/0072625 | A1 | 3/2007 | Fournier et al. |
| 2007/0085728 | A1 | 4/2007 | Matsuoka |
| 2007/0088473 | A1 | 4/2007 | Moon et al. |
| 2007/0122026 | A1 | 5/2007 | Ersue et al. |
| 2007/0135990 | A1 | 6/2007 | Seymour et al. |
| 2007/0139182 | A1 | 6/2007 | O'Connor et al. |
| 2007/0142026 | A1 | 6/2007 | Kuz et al. |
| 2007/0167147 | A1 | 7/2007 | Krasner et al. |
| 2007/0185728 | A1 | 8/2007 | Schwarz et al. |
| 2007/0240079 | A1 | 10/2007 | Flynt et al. |
| 2007/0244628 | A1 | 10/2007 | Rockett et al. |
| 2007/0252689 | A1 | 11/2007 | Rothschild |
| 2007/0298765 | A1 | 12/2007 | Dickinson et al. |
| 2008/0004790 | A1 | 1/2008 | Ames |
| 2008/0014908 | A1 | 1/2008 | Vasant |
| 2008/0054072 | A1 | 3/2008 | Katragadda et al. |
| 2008/0119203 | A1 | 5/2008 | Shalmon et al. |
| 2008/0140287 | A1 | 6/2008 | Yang et al. |
| 2008/0167937 | A1 | 7/2008 | Coughlin et al. |
| 2008/0177653 | A1 | 7/2008 | Famolar et al. |
| 2008/0215240 | A1 | 9/2008 | Howard et al. |
| 2008/0261554 | A1 | 10/2008 | Keller et al. |
| 2008/0319665 | A1 | 12/2008 | Berkobin et al. |
| 2009/0002145 | A1 | 1/2009 | Berry et al. |
| 2009/0072995 | A1 | 3/2009 | Thomas et al. |
| 2009/0093236 | A1 | 4/2009 | Balan et al. |
| 2009/0125178 | A1 | 5/2009 | Wilson |
| 2009/0210142 | A1 | 8/2009 | Couckuyt et al. |
| 2009/0216600 | A1 | 8/2009 | Hill |
| 2009/0233572 | A1 | 9/2009 | Basir |
| 2009/0287527 | A1 | 11/2009 | Kolb et al. |
| 2010/0138242 | A1 | 6/2010 | Ferrick et al. |
| 2010/0161382 | A1 | 6/2010 | Cole |
| 2010/0207787 | A1 | 8/2010 | Catten et al. |
| 2010/0332133 | A1 | 12/2010 | Harris et al. |
| 2011/0082816 | A1 | 4/2011 | Moffett |
| 2011/0213628 | A1 | 9/2011 | Peak et al. |
| 2012/0136743 | A1 | 5/2012 | McQuade et al. |
| 2012/0179363 | A1 | 7/2012 | Pierfelice |
| 2014/0222618 | A1 | 8/2014 | Stamp et al. |
| 2016/0140299 | A1 | 5/2016 | Al Harbi |
| 2016/0232598 | A1 | 8/2016 | Wasserman et al. |
| 2017/0249702 | A1 | 8/2017 | Wasserman et al. |

OTHER PUBLICATIONS

Dec. 9, 2013—U.S. Non-Final Office Action—U.S. Appl. No. 13/961,000.
Jan. 15, 2013—U.S. Final Office Action—U.S. Appl. No. 12/859,627.
Jan. 16, 2013—U.S. Non-Final Office Action—U.S. Appl. No. 12/859,634.
Jun. 7, 2013—U.S. Notice of Allowance—U.S. Appl. No. 12/859,634.
Mar. 13, 2015—U.S. Notice of Allowance—U.S. Appl. No. 12/859,627.
Mar. 23, 2015—U.S. Non Final Office Action—U.S. Appl. No. 13/446,146.
Mar. 23, 2015—U.S. Non Final Office Action—U.S. Appl. No. 13/446,192.
May 26, 2015—U.S. Non-Final Office Action—U.S. Appl. No. 13/446,146.
Nov. 20, 2015—U.S. Non-Final Office Action—U.S. Appl. No. 14/611,915.
Apr. 6, 2016—U.S. Final Office Action—U.S. Appl. No. 13/446,146.
Aug. 23, 2016—U.S. Non-Final Office Action—U.S. Appl. No. 13/446,146; KFS does not cite OAs as prior art.
Dec. 16, 2016—U.S. Non-Final Office—U.S. Appl. No. 14/959,438.
Feb. 17, 2016—U.S. Notice of Allowance—U.S. Appl. No. 13/446,192.
Jun. 27, 2016—U.S. Notice of Allowance—U.S. Appl. No. 14/721,689.
Mar. 17, 2016—(WO) International Search Report and Written Opinion—App PCT/US16/14044.
May 4, 2016—U.S. Notice of Allowance—U.S. Appl. No. 14/444,247.
Oct. 31, 2016—U.S. Notice of Allowance—U.S. Appl. No. 15/058,371.
Oct. 7, 2016—U.S. Office Action—U.S. Appl. No. 15/135,101.
Sep. 15, 2016—U.S. Non-Final Office Action—U.S. Appl. No. 14/959,402.
Sep. 9, 2016—U.S. Non-Final Office Action—U.S. Appl. No. 14/989,390.
Apr. 4, 2017—U.S. Notice of Allowance—U.S. Appl. No. 14/959,438.
Feb. 17, 2017—U.S. Notice of Allowance—U.S. Appl. No. 13/446,146.
Jan. 20, 2017—U.S. Notice of Allowance—U.S. Appl. No. 14/959,402.
Mar. 10, 2017—U.S. Notice of Allowance—U.S. Appl. No. 15/135,101.
Mar. 3, 2017—U.S. Final Office Action—U.S. Appl. No. 14/989,390.
Nov. 16, 2017—U.S. Non-Final Office Action—U.S. Appl. No. 15/593,529.
Nov. 2, 2017—U.S. Non-Final Office Action—U.S. Appl. No. 15/258,312.
Nov. 2, 2017—U.S. Non-Final Office Action—U.S. Appl. No. 15/180,416.
Sep. 20, 2017—U.S. Notice of Allowance—U.S. Appl. No. 14/989,390.
Jun. 15, 2018—U.S. Notice of Allowance—U.S. Appl. No. 15/258,312.
Jun. 22, 20182—(EP) Supplementary European Search Report—EP16746952.
Jun. 25, 2018—U.S. Non-Final Office Action—U.S. Appl. No. 15/482,954.
Jun. 4, 2018—(CA) Office Action—App 2,975,450.
Mar. 27, 2018—U.S. Notice of Allowance—U.S. Appl. No. 15/593,529.
May 18, 2018—U.S. Non-Final Office Action—U.S. Appl. No. 15/180,416.
May 31, 2018—U.S. Non-Final Office Action—U.S. Appl. No. 15/463,594.
May 31, 2018—U.S. Non-Final Office Action—U.S. Appl. No. 15/598,732.
Nov. 13, 2018—U.S. Non-Final Office Action—U.S. Appl. No. 15/819,066.

(56) References Cited

OTHER PUBLICATIONS

Sep. 6, 2018—U.S. Non-Final Office Action—U.S. Appl. No. 15/398,256.
Jan. 31, 2019—U.S. Final Office Action—U.S. Appl. No. 15/482,954.
Jun. 5, 2019—U.S. Notice of Allowance and Fees Due—U.S. Appl. No. 15/482,954.
Mar. 15, 2019—U.S. Notice of Allowance—U.S. Appl. No. 15/398,256.
May 30, 2019—U.S. Notice of Allowance and Fees Due—U.S. Appl. No. 15/819,066.
May 8, 2019—(EP) Examination Report—EP16746952.7.
May 9, 2019—(CA) Office Action—Application No. 2,975,450.
Oct. 1, 2019—U.S. Notice of Allowance—U.S. Appl. No. 16/417,040.
Sep. 10, 2019—U.S. Notice of Allowance—U.S. Appl. No. 16/028,215.
Aug. 17, 2020—U.S. Non-Final Office Action—U.S. Appl. No. 16/148,522.
Jul. 1, 2020—(IN) Examination Report—App. No. 201727030821.
May 1, 2020—(CA) Office Action—App. No. 2975450.
Feb. 1, 2021—U.S. Notice of Allowance—U.S. Appl. No. 16/148,522.
ABIresearch, In-Vehicle Infotainment Storage and Networking, Hard Disks, Flash Memory, USB, SD, Bluetooth, UWB, Pod Kits and Other Technologies, http://www.abiresearch.com/producs/market_research/In-Vehicle_Infotainment, retrieved on Feb. 6, 2009, 2 pages.
ABIresearch, Wireless Connectivity to the Automobile Is Hindered by Lack of Standards and Interoperability, Jul. 31, 2007, http://www.abiresearch.com/abiprdisplay.jsp?pressid=894, retrieved on Feb. 6, 2009, 1 page.
Allstate Motor Club Launches Roadside Assistance Mobile App for iPhone and BlackBerry Users, Oct. 27, 2009; http://money.cnn.com/news/newsfeeds/articles/prnewswire/2009102711, 2 pages.
Anonymous: "On-Board Diagnostics—Wikipedia", Jan. 29, 2015, XP055478209.
Automotive Fleet, Aug. 2009, vol. 48, No. 9, Charging for Preventable Accidents: What's the Payoff?, Grace Lauron, 4 pages.
Automotive Fleet, Emkay Partners With Networkcar to Launch New Networkfleet Telematics Solution, Apr. 29, 2008, © 2009 Automotive Fleet, 1 page.
Automotive Fleet, May 2009, Bright Ideas Energize Fleet Management, Cindy Brauer and Thi Dao, 5 pages.
Automotive Fleet, OnStar Receives Honors at Telematics Update Awards © 2009 Automotive Fleet, http://www.automotive-fleet.com/News/Print/Story/2008/05/OnStar Receives, retrieved on Feb. 6, 2009, 1 page.
Automotive Fleet, Sep. 2009 vol. 48 No. 10, 10 Recommendations: What Drivers Should Do After a Fleet Accident, Mike Antich, 4 pages.
Automotive Fleet, Sep. 2009 vol. 48 No. 10, DWT Proven to Increase Accidents, Grace Lauron, 5 pages.
Automotive Fleet/2009 NAFA Planning Guide, NAFA 2009 Institute & Expo Advanced Planning Guide, 2 pages.
BMW Assist, Safety & Convenience Services © 2006 BMW of North America, LLC, 16 pages.
BoatUS Towing App—Free for All Boaters—BoatUS, http://www.boatus.com/towing/app.asp, downloaded Feb. 25, 2015, pp. 1-2.
CIO, High-tech Cars: The Coolest Automotive Technologies, Denise Dubie, Network World, Oct. 5, 2008, http://www.cio.com/article/print/452913, retrieved on Feb. 6, 2009, 2 pages.
Diagnostic Trouble Codes (DTCs) Powertrain Codes for OBD II (OBD-2) equipped GM vehicles, compiled by Anthony W. Haukap; http://myweb.accessus.net/~090/dtocbd2p.html; retrieved on Jul. 20, 2009, 20 pages.
Geotab Management by Measurement, Geotab for Insurance Companies © 2008, 1 page.
Inrix News, INRIX Real-Time Traffic Now Available on Over 75 Navigation and Mobile Devices, Jul. 30, 2007, http://www.inrix.com/news_75Devices_30July2007.asp, retrieved Feb. 6, 2009, 1 page.
Intomobile, Volkswagen Launches iPhone Optimized Website Featuring Access to Emergency Roadside Assistance, http://www.intomobile.com/2009/03/30/volkswagen-launches-iPhone-optimized-website-featuring-access, retrieved on Jun. 23, 2009, 3 pages.
Lapadula, A., COWS Specification of the On Road Assistance Scenario, Dec. 19, 2007, pp. 1-9.
Maya Software Technologies, White Paper, Automotive Telematics—Market Overview and Security Considerations © 2001, 12 pages.
Motorola Demonstrates New Communications System Available in BMW's Global 2005 Model Year Vehicle Line, http://www.virtualizationconference.com/49572/print, 2 pages, retrieved on Feb. 6, 2009.
Real time traffic broadcast to debut in Australia, http://www.gpsbusinessnews.com, retrieved Feb. 6, 2009 1 page.
RepairPal for iPhone, http://repairpal.com/mobile, retrieved Feb. 2, 2009, 13 pages.
Roadside Assistance with Emergency Roadside Service, http://www.geico.com/getaquote/auto/emergency-road-service/, downloaded Feb. 25, 2015, pp. 1-5.
Software Engineering for Service-Oriented Overlay Computers, D1.4a: UML for Service-Oriented Systems, Sensoria, Oct. 10, 2007, pp. 1-21.
Techworld, Pimp your ride: Cool car technology, Denise Dubie (Network World) Jul. 10, 2008; http://www.techworld.com/au/article/262977/pimp_your_ride_cool_car, retrieved on Feb. 6, 2009, 3 pages.
TMC News, ATX Launches Enhanced Automatic Collision Notification for BMW, Jan. 11, 2009, http://tmcnet.com/usubmit/2009/01/11/3905139.htm, 4 pages.
TradeVibes, The RepairPal iPhone App is Available! © 2007-2008 Mill River Labs, www.tradevibes.com/news/view/repairpal?article=86228, retrieved on Feb. 2, 2009, 1 page.
U.S. Appl. No. 29/396,366, filed Jun. 29, 2011.
U.S. Copyright Registration No. TX 7-150-076, "Allstate Motor Club Roadside Assistance", registered Mar. 26, 2010.
U.S. Copyright Registration No. TX 7-150-080, "Mini Road Assist", registered Mar. 29, 2010.
U.S. Copyright Registration No. TX 7-150-082, "Mini Road Assist", registered on Mar. 19, 2010.
U.S. Copyright Registration No. TX 7-195-526, "Allstate Motor Club Roadside Assistance", registered Mar. 30, 2010.
U.S. Copyright Registration No. TX 7-229-997, "Allstate Motor Club Roadside Assistance", registered Mar. 19, 2010.
U.S. Copyright Registration No. TX 7-329-434, "Mini Road Assist", registered on Mar. 19, 2010.
When Accidents Happen, Nationwide Mobile App for IPhone is on Your Side, Melanie Broemsen, May 10, 2009, http://www.articlesbase.com/print/909297, retrieved on Jun. 23, 2009, 1 page.
Übergizm™, RepairPal: Roadside Assistance from the iPhone, posted Jan. 22, 2009, http://www.ubergizmo.com/15/archives/2009/01/repairpal_roadside_assistance, retrieved on Feb. 2, 2009, 1 page.
"BMW Assist, Safety & Convenience Services," BMW of North America, LLC, 2008, 16 Pages.
Extended European Search Report for European Application No. 16746952.7 dated Jun. 5, 2018, 8 pages.
International Preliminary Report on Patentability for International Application No. PCT/US2016/014044, dated Aug. 17, 2017, 7 pages.

* cited by examiner

ASSISTANCE ON THE GO

This is a continuation of U.S. application Ser. No. 16/148,522 entitled "Assistance on the Go," filed Oct. 1, 2018 which application claims priority to and is a continuation of U.S. patent application Ser. No. 15/258,312, entitled "Assistance on the Go," filed Sep. 7, 2016 that is a continuation and claims priority to U.S. patent application Ser. No. 14/721,689, entitled "Assistance on the Go," filed May 26, 2015 (now U.S. Pat. No. 9,466,061) that is a continuation of and claims priority to U.S. patent application Ser. No. 12/859,627, entitled "Assistance on the Go," filed Aug. 19, 2010 (now U.S. Pat. No. 9,070,243) which claims priority to both U.S. Provisional Application Ser. No. 61/235,217, entitled "Assistance on the Go," filed Aug. 19, 2009, and U.S. Provisional Application Ser. No. 61/255,349, entitled "Assistance on the Go," filed Oct. 27, 2009, all of which are herein incorporated by reference in their entireties.

TECHNICAL FIELD

Aspects of the disclosure relate to roadside service and other enhanced services using a mobile device. More specifically, aspects of the disclosure relate to wireless-enabled devices that communicate with a remote server computer to facilitate and enhance roadside services and other services.

BRIEF DESCRIPTION OF THE DRAWINGS

Aspects of the invention may take physical form in certain parts and steps, embodiments of which will be described in detail in the following description and illustrated in the accompanying drawings that form a part hereof, wherein.

It will be apparent to one skilled in the art after review of the entirety disclosed that the steps illustrated in the figures listed above may be performed in other than the recited order, and that one or more steps illustrated in these figures may be optional.

SUMMARY OF INVENTION

In one embodiment in accordance with aspects of the disclosure, a mobile computerized apparatus configured to provide membership status in a roadside assistance program after occurrence of a roadside event is disclosed. The apparatus executes instructions that cause/allow the apparatus to receive input related to an electronic membership card, retrieve from a data store membership information associated with the vehicle, and dynamically update the electronic membership card for display on the apparatus.

In one embodiment in accordance with aspects of the disclosure, a mobile computerized apparatus for use with a roadside assistance program to assist in identifying a service provider, such as a tow truck, is disclosed. The apparatus transmits relevant information to a remote server. The server in turn provides information about a plurality of service providers available to service the vehicle.

DETAILED DESCRIPTION

Figure 1:
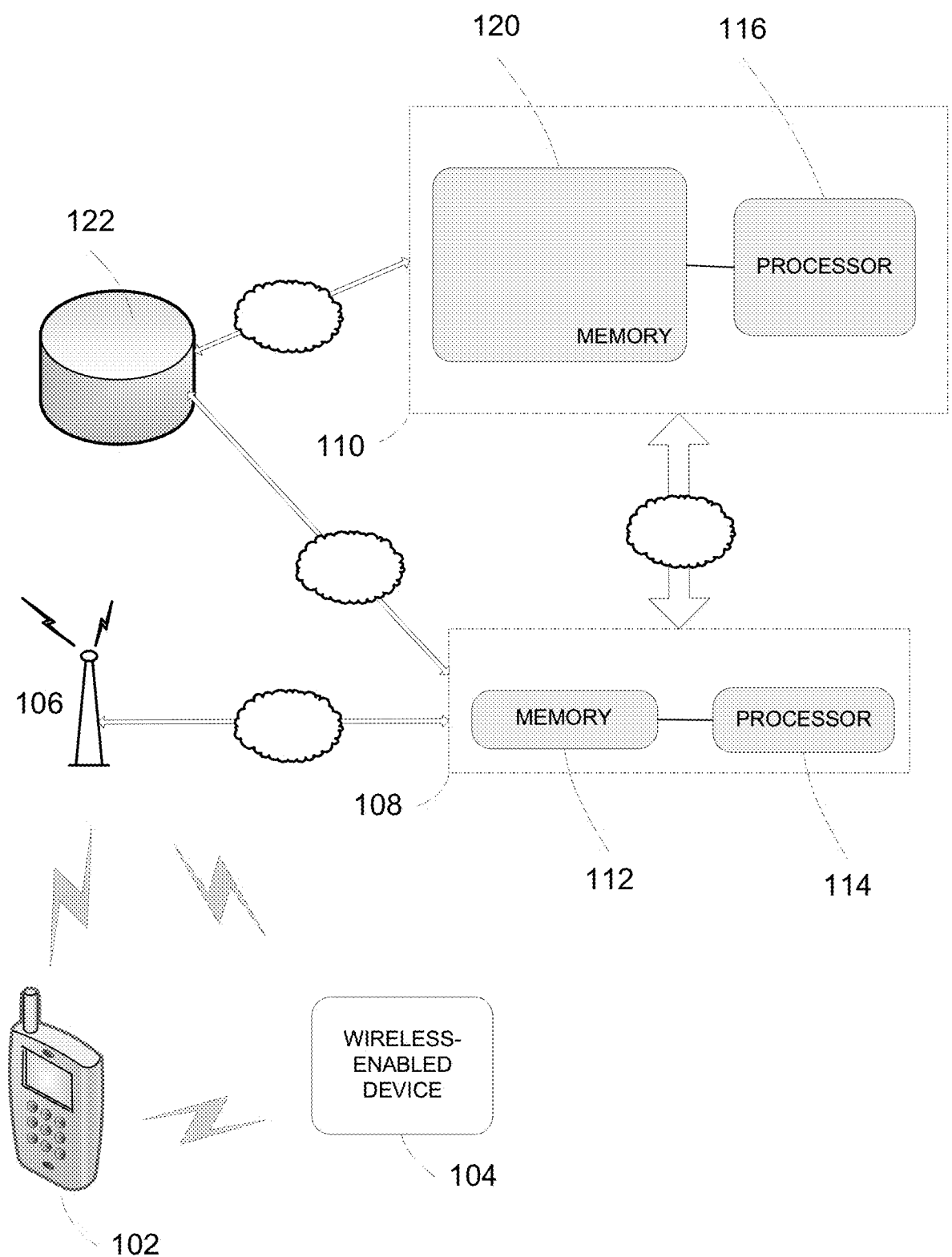
FIG. 1 depicts an illustrative operating environment in accordance with aspects of the invention.

FIG. 1 depicts an illustrative operating environment in accordance with aspects of the invention. A user of wireless-enabled devices 102, 104 may communicate with a wireless access point 106. The wireless-enabled device 102 may be a mobile telephone with applications and other functionality (e.g., APPLE® iPhone, RESEARCH IN MOTION® Blackberry, HTC® Android-based G1, or other mobile telephone), a handheld device with Wi-Fi connectivity (e.g., APPLE® iTouch), a mobile telephone with an enhanced roadside assistance application installed, or other portable electronic device. The wireless-enabled devices 102, 104 may be configured to communicate with a wireless access point 106 such as a cellular tower operated by a cellular service provider. Alternatively, the wireless access point 106 may be a Wi-Fi (e.g., compatible with IEEE 802.11a/b/g/etc. wireless communication standards) hotspot where the wireless-enabled device 102, 104 may obtain access to the Internet (e.g., to communicate using online chat applications or voice-over-IP applications). One skilled in the art will appreciate that other techniques may be used to allow devices 102, 104 access over a wide area network (WAN).

The data communicated from the user devices 102, 104 may be transmitted to a server 108. The server 108 (e.g., a high-performance Intel® computer) may include a memory 112 storing computer-readable instructions and a processor 114 for executing the computer-readable instructions. The data communicated to the server 108 from the user device 102, 104 may be transmitted over the WAN through wireless access point 106. Meanwhile, another server 110 may be comprised of a memory 120 storing computer-readable instructions and a processor 116 for executing the computer-readable instructions in accordance with aspects of the invention. The memories 112, 120 may also store computer data files that hold information that may be useful to applications running on the user's mobile device 102, 104 or the servers 108, 110. For example, the computer data files may include user login/profile information, insurance policy (or motor club) information, service provider list and related information, and/or other information. The data collected and stored in the data files may be used to support one or more of the numerous features disclosed throughout this disclosure.

One skilled in the art will appreciate that the server (e.g., servers 110 and 108) is not limited to a single machine or device. The server may be embodied as a web server or Internet-accessible server. Furthermore, the term server refers to any system of computers and/or devices (e.g., firewalls, routers, caching systems, proxy servers, etc. or combination thereof) that may be used to provide access to services and features available for use. As such, different reference to the server performing particular steps does not require that the same machine/device perform all the steps.

Servers (108 and 110), data store 122, and wireless access point 106 may communicate over a wired and/or wireless connection. In some instances, a private, secure connection may be established between one or more of these components. For example, server 108 and server 110 may communicate over a network cloud representing the Internet. Alternatively, server 108 and data store 122 may communicate over a secure WAN or a dedicated T1 (or other telecommunications) line. Furthermore, wireless devices 102, 104 may include a processor, memory, display screen (e.g., touchscreen), keypad, sensors (e.g., motion, light, etc.), camera, global positioning system (GPS) chip, audio output/input devices, and other electronic components configured for use in mobile phones, PDAs, and mini-laptops.

In another example, one or more servers 108, 110 may include a processor, RAM, ROM, communications module, and/or memory storing an operating system, applications, and/or data. The server may have a processor for controlling overall operation of the server and its associated components, including random access memory, read-only memory, communications module, and memory. Such a server may include a variety of computer readable media. Computer readable media may be any available media, both tangible and intangible, that may be accessed by the server and include both volatile and nonvolatile media, and removable and non-removable media. By way of example, and not limitation, computer readable media may comprise a combination of computer storage media and communication media. Computer storage media include volatile and nonvolatile, removable and non-removable media implemented in any method or technology for storage of information such as computer readable instructions, object code, data structures, program modules or other data. Computer storage media include, but are not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by the server.

The aforementioned server may include one or more applications representing the application data stored in RAM memory while the server is on and corresponding software applications (e.g., software tasks) are running on the server. The aforementioned communications module may include a microphone, keypad, touch screen, and/or stylus through which an (optional) user of the server may provide input, and may also include one or more of a speaker for providing audio output and a video display device for providing textual, audio/visual and/or graphical output. Software may be stored within the memory and/or storage to provide instructions to the processor for enabling the server to perform various functions. For example, memory may store software used by the server, such as an operating system, application programs, and/or an associated database. Alternatively, some or all of the computer executable instructions for the server may be embodied in hardware or firmware. Moreover, a database (or data store) 122 may provide centralized storage of data.

Such a server may operate in a networked environment supporting connections to one or more remote computing devices. The remote computing devices may be personal computing devices or servers that include many or all of the elements described above relative to the server. Remote computing devices may be a mobile device communicating over wireless carrier channel. The network connections depicted in the figures may include a local area network (LAN) and/or a wide area network (WAN), but may also include other networks. When used in a LAN networking environment, the server may be connected to the LAN through a network interface or adapter in the communications module. When used in a WAN networking environment, the server may include a modem in the communications module or other means for establishing communications over the WAN, such as the Internet. It will be appreciated that the network connections shown and described are illustrative and other means of establishing a communications link between the computing devices may be used. The existence of any of various well-known protocols such as TCP/IP, Ethernet, FTP, HTTP and the like is presumed, and the system can be operated in a client-server configuration to permit a user to retrieve web pages from a web-based server. Any of various commonly known web browsers can be used to display and manipulate data on web pages.

Figure 2:
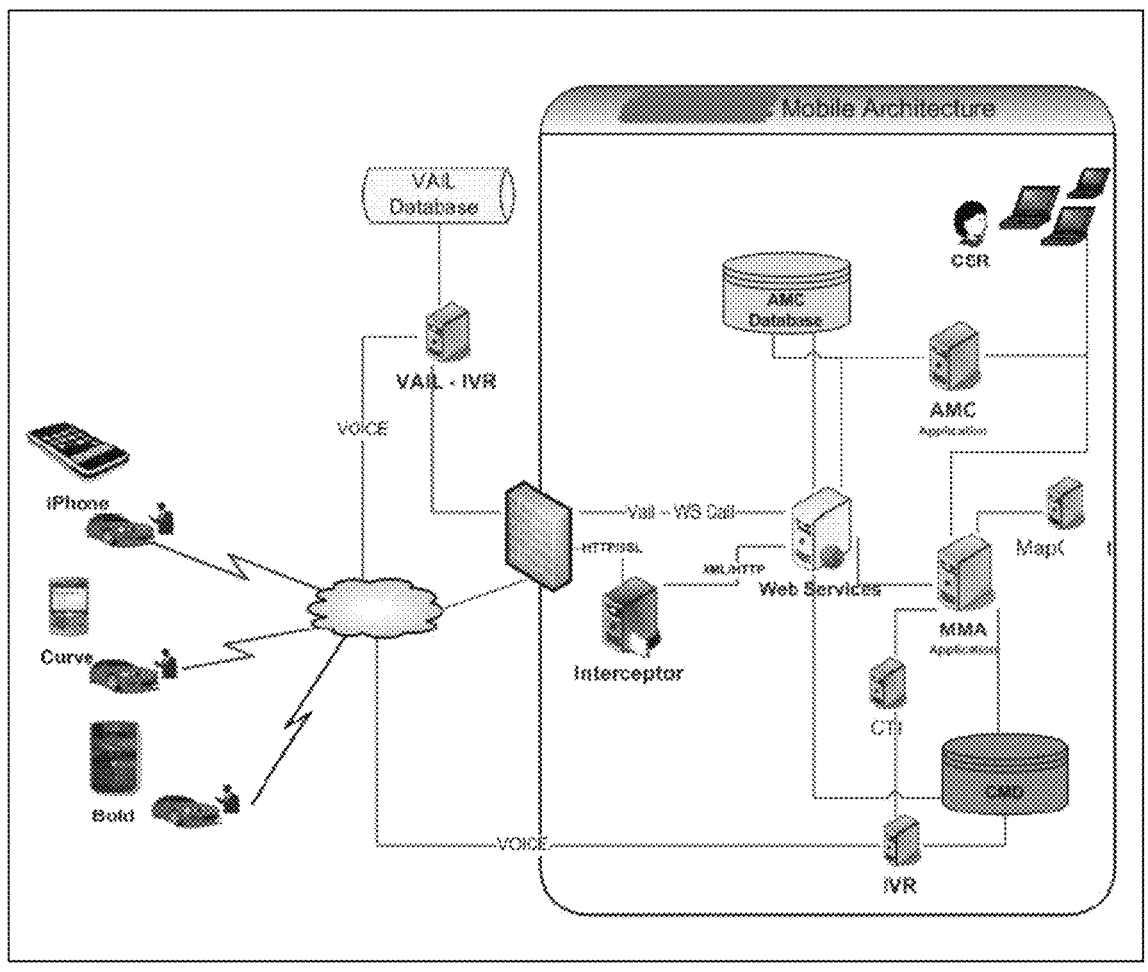
FIG. 2 illustrates an exemplary operating environment in accordance with aspects of the invention.

Referring to FIG. 2, numerous mobile wireless-enabled devices are illustrated connecting to mobile architecture 200 over a wireless network. The mobile architecture includes wired and/or wireless connections with servers, data store/database, and a wireless access point. An interactive voice response (IVR) system may also be included to facilitate services not using a cellular data plan. Numerous different application servers and data stores may be included in the mobile architecture, including, but not limited to, a database, application server, map server, software application for use at a call center or for a customer service platform), CTI (i.e., computer telephony integration—which presents voice and data within a customer service platform), data store in which customer and supporting data tables may be housed), IVR (interactive voice response) server, web services application server, interceptor, and firewall. The mobile wireless-enabled devices in FIG. 2 may have application software installed in accordance with various aspects of the invention. The application software may permit the mobile device to communicate with a remote web services application server through the firewall. In an alternative embodiment, the mobile device may have a thin-client installed that provides an interface for the mobile device to execute application software on a remote server. One skilled in the art will appreciate the numerous advantages and disadvantages related to the thin-client and thick-client design choices contemplated by the various embodiments of the invention. Moreover, in some embodiments, the mobile device may receive notifications of software updates (e.g., new versions) of the application and can receive automatic (or manually authorized) download and installation of the updates.

Flat Tire. In one example in accordance with aspects of the invention, John Doe's (i.e., a user) vehicle has a flat tire. John has previously installed a roadside assistance application in accordance with various aspects of the invention on his APPLE® iPhone, and he has registered his vehicle with the application. After launching the roadside assistance application, the registered application attempts to assess whether John is in a safe location. If John presses the "911" icon, the application will automatically dial the emergency line to locate emergency assistance for John. However, in this case, John is at the parking garage near his office building, and he presses the "Yes" icon.

Figure 5:
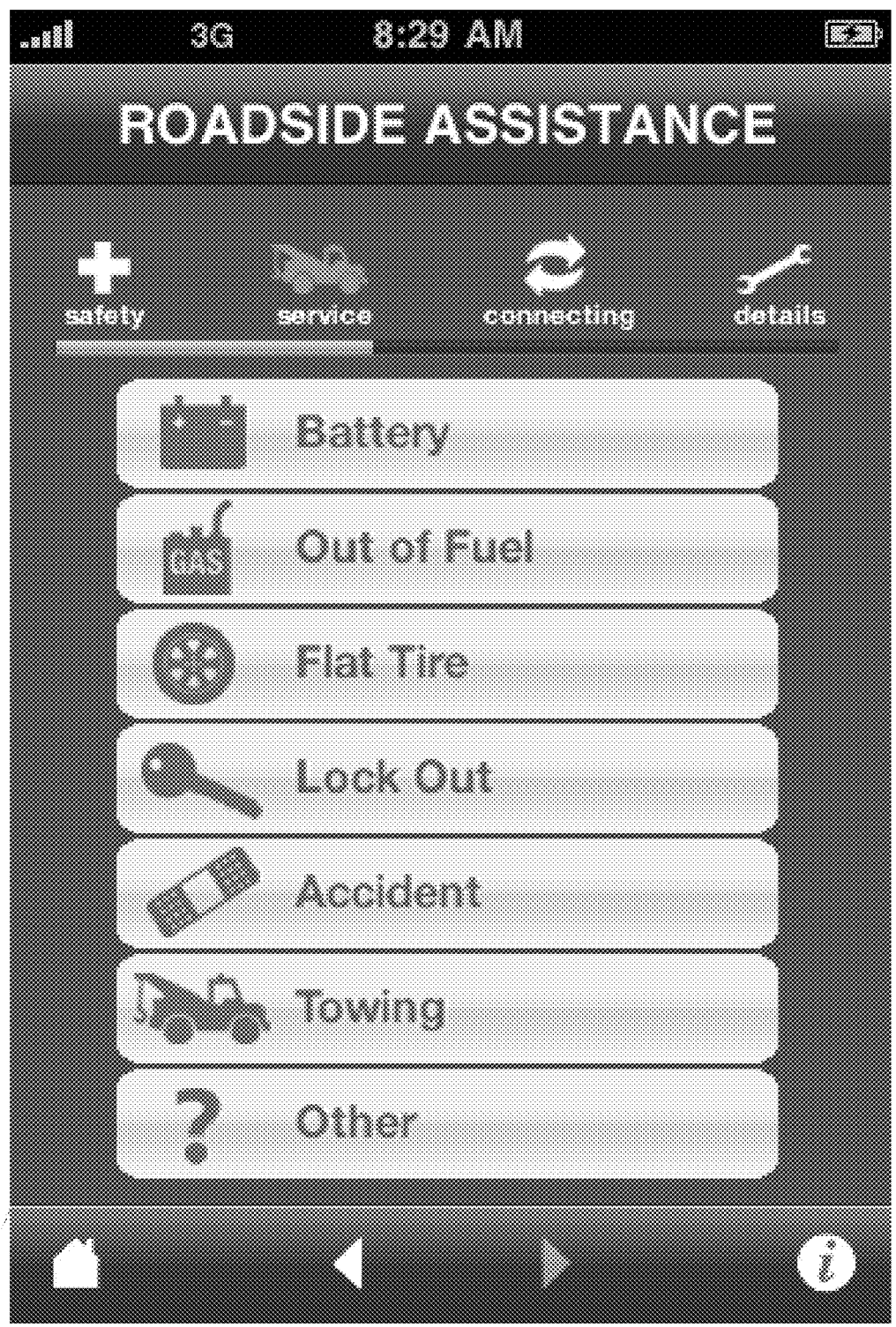

Next the application, in this example, requests information about John's service needs (see FIG. 5). The application provides a list of services 500 to John in a "Service Type" selection box. Some examples of service types include, but are not limited to, locked out (i.e., locked out of one's vehicle), flat tire/tire needs air/tire change, dead battery/battery service/battery replacement, jump start, out of gas/incorrect fuel/fluids, towing, vehicular accident/vehicle fire, mechanical failure/brakes/transmission/engine, lock out/locked out/lost keys/damage keys/keys locked in car, locksmith, winch/stuck, won't start, stalled while driving, reunite, dealer service, transfer, recovery, wrecker, and other (i.e., the service type when none of the listed services are appropriate). In addition, in those cases where the mobile device 102, 104 provides functionality to retrieve and display a user's phone number, the application may retrieve and display that information. John, in some embodiments, may be permitted to edit the callback number displayed by the application if he desires.

In an alternative example, the mobile device 102, 104 may automatically receive information about the vehicle directly through communications with the vehicle's onboard diagnostics system (e.g., OBD II interface or other comparable interface with the vehicle's diagnostics system). The mobile device 102 may be equipped with appropriate circuitry and/or firmware/software to communicate via the requisite communication protocols for the OBD II interface. Alternatively, an external accessory (e.g., peripheral device) may be attached to the OBD II interface to translate the OBD II codes/data into a format compatible with the communication protocol of the application on the mobile device 102, 104. For example, the external accessory may be a device compliant with BLUETOOTH® that receives the OBD II data and transmits it via BLUETOOTH® to the mobile device 102. Alternatively, the external accessory may attach to the pins on a mobile device 102 and receive the data wirelessly transmitted from the OBD II interface. The information received from the vehicle (e.g., through the OBD II interface) may be used to select the appropriate service type without requiring additional user intervention. Moreover, the OBD II codes may be useful to a service provider (e.g., towing company or mechanic) in contemplating the needs of the user in preparation for addressing the user's calamity.

In yet another alternative example, John's vehicle may be equipped with a wireless transmission module (e.g., transceiver circuitry) to transmit diagnostic information to a car dealership that services his vehicle. The car dealership may then transmit the information to John (e.g., via an onboard display on the vehicle's dashboard). In accordance with various aspects of the invention, assume John Doe is driving a BMW® brand vehicle equipped with BMWAssist®. John may register on a server 108 to have updates from a third party (e.g., BMW) computer server routed through a server 108 to his mobile device 102 whenever a defect in his vehicle is detected. John Doe can designate computer server 108 to receive notifications on his behalf from the third-party server. As such, the computer server 108, in accordance with various aspects of the invention, can process and transmit the notification to John's mobile device 102. For example, the third-party server may receive notification that a flat-tire has occurred on John Doe's vehicle, and may send a notification to John Doe's mobile device 102 indicating the service type required. Consequently, the "Service Type" information may be pre-filled in the application selection screen. Moreover, in such an example, John may or may not need to be physically present at his vehicle. For example, John may have parked his vehicle in an outdoor lot on a cold winter day while at his office, and he may receive a notification (e.g., a push notification available on APPLE® iPhone OS 3.0 and later, SMS message, e-mail, etc.) on his mobile device 102 in the afternoon stating that his battery has gone dead. John may use his mobile device 102, in accordance with the various aspects of the invention disclosed herein, to contact a preferred service provider and repair his vehicle, all while within the comfort of his warm office and not physically present at his vehicle.

Furthermore, the OBD II codes (or other types of diagnostic codes) transmitted from the vehicle to the mobile device 102 may be translated to map against the numerous "Service Type" selections available. OBD II codes (and other types of diagnostic codes) may be different for different make and model of cars; therefore, when a user registers with the application and provides information about his/her vehicle, the appropriate mapping for the type of car can be identified and used for translating diagnostic codes. The mapping table may be stored in computer memory at the mobile device 102 or may be maintained in memory 112 at a remote server 108. Likewise, the translation may occur at a processor at the mobile device 102 or at the remote server 108. One skilled in the art will appreciate that there are numerous benefits and drawbacks to each approach.

Next, mobile device 102 transmits data, either directly or indirectly, to the remote server 108. The transmission may occur in response to a user keypress (e.g., the user selecting a phone icon on the mobile device 102 display). Alternatively, the transmission may occur automatically (e.g., in the embodiments where the OBD II codes are automatically retrieved and transmitted). The data transmitted from the mobile device 102 may include, but is not limited to, the "service type" selected, user identification information (e.g., the mobile device 102 phone number, user's login/username, etc.), location information (e.g., retrieved from the mobile device 102, manually entered by the user, triangulated from cellular towers by the cellular service provider, etc.), vehicle diagnostic data (e.g., OBD II data/codes), and other useful information.

Next, the server 108 receives the data transmitted from the mobile device 102. The server 108 may use the data to identify one or more service providers (e.g., towing company, taxi company, mechanic, etc.) in the area. In one embodiment, the identification may occur in real-time using an algorithmic selection process that maintains ratings and other metrics about the service providers, and selects one or more provider based on these ratings and metrics. In another embodiment, the provider identified may be based on a company's preferred high-quality relationship with particular service providers.

In one embodiment in accordance with aspects of the invention, the server 108 may transmit information about one or more service providers to the mobile device 102 for the user's review and final selection. As such, information such as a service provider's name, contact information, rating, and other metrics (e.g., distance from mobile device's location, cost, etc.) may be displayed on the user's mobile device 102. In an alternative embodiment, the server 108 may communicate directly with a service provider and hire a service provider to service the user. For example, the server 108 may communicate over a network (e.g., the Internet, WAN, etc.) with a service provider's server 110. The server 110 may receive a request for a particular service. The request may include pertinent information about the service required, including the location of the vehicle requiring servicing, the type of service required, the make/model/color of the vehicle requiring servicing, the maximum charge allowed for the service (e.g., pre-contracted towing rates), and other information.

The service provider's server 110 may communicate the information to mobile devices carried by (or installed in the vehicles of) its employees in the field. As such, the employee can accept or reject the new service request. Alternatively, the server 110 may communicate the information to employees located at an office and that are responsible for facilitating new service requests and dispatching service vehicles (e.g., using the Beacon system). Once the service provider accepts the new service request, their server 110 transmits an acceptance message to the server 108. In order to facilitate simultaneous communication to multiple service providers, the server 108 may be required to send a confirmation message to the service provider once acceptance has been received and accepted. At least one benefit of such a system is that multiple service providers may be contacted with a request for a particular service, and then only the "best" service provider willing to accept the service request may be confirmed for the job. In one embodiment in accordance with various aspects of the invention, the service providers may include a price or quote (or other information, such as estimated time of arrival at the user's vehicle) in its acceptance message. As such, service providers may compete (e.g., in an auction-like system) for new servicing jobs. Alternatively, the "best" service provider may simply be the first to reply with an acceptance message. In some embodiments, the server 108 may also transmit a cancellation message to the other service providers (i.e., everyone except the one receiving a confirmation message) once a new service request has been filled so that the other service providers are updated about the current status of filled new service requests. Alternatively, new service requests may automatically expire after a predetermined time period. As such, a cancellation message may not be necessary.

Figure 6:
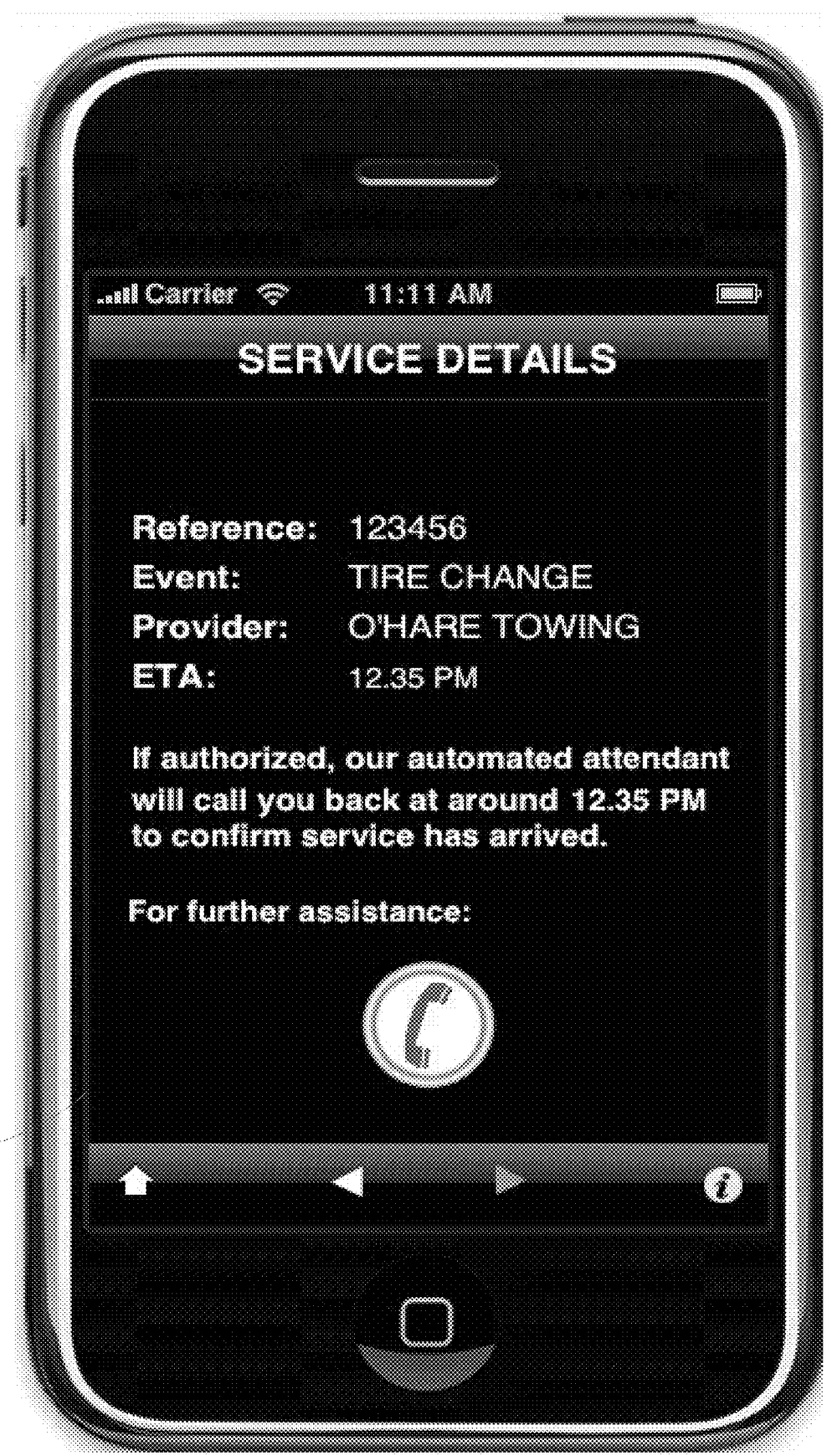

The server 108 may transmit to the mobile device 102 information about the service provider that will be servicing the user's vehicle. The information may include, but is not limited to the name of the service provider, the estimated time of arrival (ETA), the phone number for the service provider (or the mobile phone number of the particular service vehicle servicing the user's vehicle), and/or other useful information. For example, FIG. 6 illustrates an exemplary "service details" screen 600. In some embodiments, the user is conveniently provided with the option of providing feedback while he/she waits for a service provider to arrive. In some embodiments, the mobile device 102 may receive regular (e.g., every 5 minutes, real-time, or on another regular or periodic basis) updates from the server 108 with the approximate location of the service vehicle that will be servicing the user's vehicle. The approximate location may be displayed on a map or may be provided as an approximate distance from the user's vehicle. Moreover, the approximate time until arrival may be displayed and updated on a regular or periodic basis.

In an alternative embodiment, server 108 may provide the mobile device 102 with information about service providers. The user may contact the service providers directly (e.g., by calling their office) to arrange for a service provider. At least one advantage of such a system over simply looking up service providers in a telephone directory is that the server 108 may be able to provide an enhanced list of service providers to the mobile device 102. For example, the list may include one or more service providers that are competent in the particular type of service required of the user's vehicle. As such, the user need not be concerned with whether a particular service provider offers the particular service required of the user's vehicle.

In addition, the server 108 may transmit relevant information to the user's insurance company, emergency contacts, police, fire department, taxi company, and/or others. For example, information necessary for starting a claim may be submitted to the insurance company so the user's process for submitting the claim is already partially completed. In some embodiments, the user may retain full control over whether the insurance company is notified of the user's vehicle situation.

Moreover, a user's parents, spouse, coworkers, etc. may be contacted to alert them about the user's vehicle situation. For example, in one embodiment, the server 108 may receive notification from the user's mobile device 102, and then reference the user's preferences. A copy of the user's preferences may be saved in memory, e.g., as a data file, at the server 108. The preferences may indicate which additional people or organizations to contact and what information to provide to those people. In another embodiment, the application may enable the user to save his/her emergency contact's information on the mobile device 102. For example, the user may enter his insurance agent's information, personal contact information, and emergency contact information. Alternatively, the screen may permit entry of other relevant information about each contact (e.g., email address, SMS number, alternate phone numbers, etc.) As such, the user may conveniently access his contacts through the application's menu.

In one embodiment, the server 108 may automatically send a text message (e.g., SMS, etc.) to the user's parent's phone number (or other people's phone numbers) with a predetermined message. The server 108 may alternatively send an e-mail message to the desired person/organization's email address. In some embodiments, the desired person may have an application installed on his/her mobile device 102 that receives a push notification initiated by server 108. The push notification may include a textual message and/or other appropriate information (e.g., the location of the vehicle/user, the condition of the vehicle, whether anyone is injured, etc.) Alternatively, a customer service representative may be alerted by server 108 to manually call the desired person/organization and provide an appropriate message.

In another embodiment in accordance with aspects of the disclosure, the user may be provided with a guided experience when requesting roadside assistance. The guided experience may be implemented using a series of icons along the top of the screen on the user's mobile device 102. One skilled in the art will appreciate that the guided experience may be provided through different configurations of the icons; for example, the icons may be placed vertically along a side of the screen, or they may be configured in a circular or other pattern around the screen. The series of icons may tell the user where he/she in the process of obtaining roadside assistance.

Figure 3:
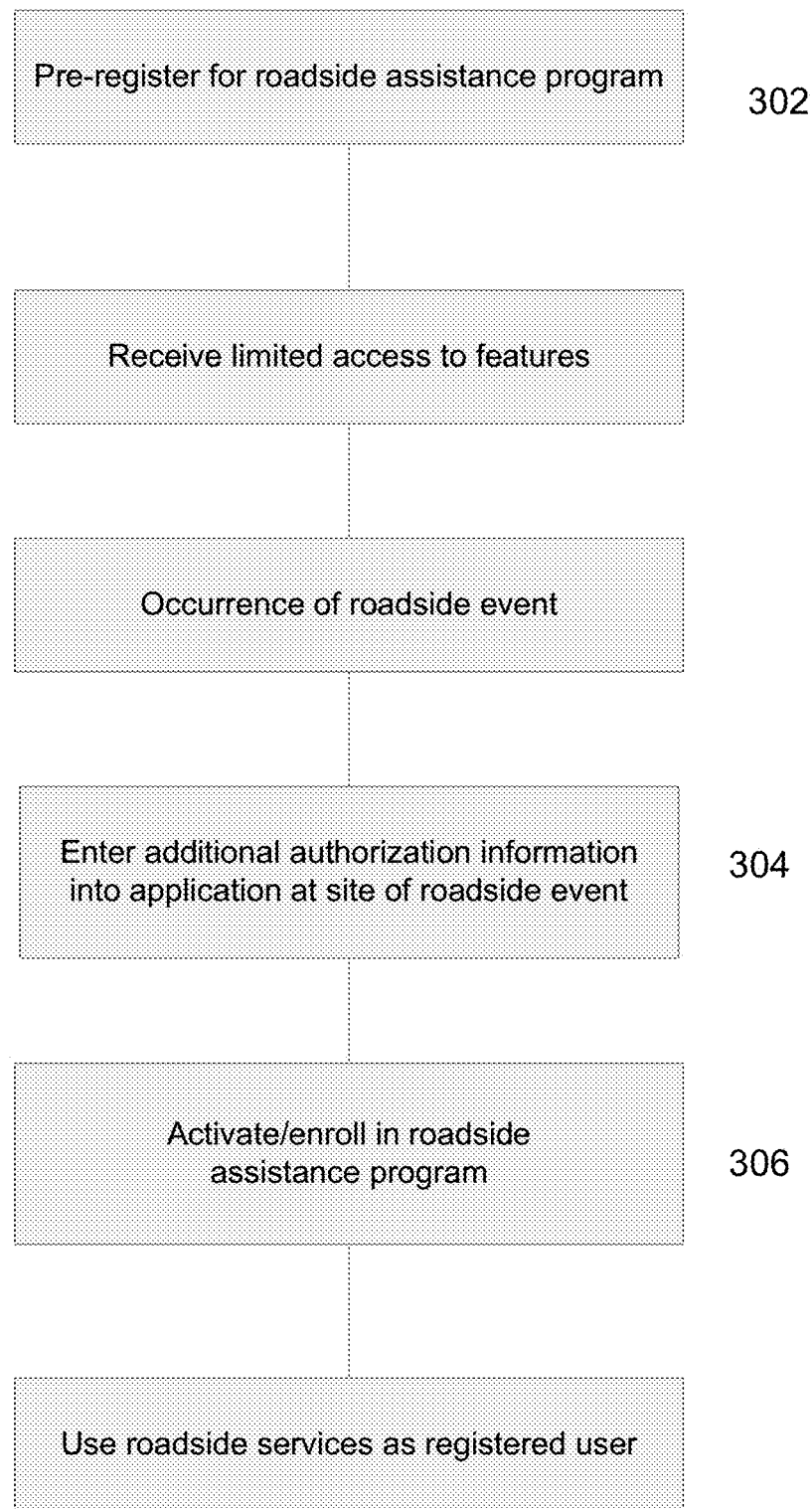
FIG. 3 is a flowchart illustrating the pre-registration process in accordance with aspects of the disclosure.

In some embodiments in accordance with aspects of the invention, the application may verify that the user is in a safe location. An option for calling "911" may be provided should the user require immediate emergency assistance. Next, as depicted in FIG. 3, the application may request information about the type of service the user requires. As discussed in detail above, there are numerous service types 300 that may be available for the user to select. Moreover, as already discussed herein, in some embodiments, the user's vehicle may be equipped with appropriate technology to communicate directly with the mobile device to provide/recommend the service type information. Next, the application may direct the user to call a roadside assistance customer service representative to identify and secure the appropriate roadside service provider for the user. The application on the mobile device 102 may transmit the appropriate information (e.g., member number, member's zip code, service type requested, and/or user's current location) to the customer service center. As such, the representative may already have information about the user and/or user's vehicle on-screen when the conversation begins. Additional information about aspects of this feature are disclosed below, including the use of a caller ID feature to automatically match the user with his/her information.

Once the service provider arrives to provide the user's vehicle with roadside assistance, the user may use his/her mobile device 102 to authorize payment to the service provider. For example, the mobile device 102 may display an icon to permit the user to indicate that service has been satisfactorily provided and completed. Upon receipt of a corresponding message at the server 108 from the mobile device 102, the server 108 may authorize release of funds to the service provider. For example, the server 108 may authorize a bank to perform an ACH transaction of funds directly into the service provider's bank account. In one example, the funds are sourced from the user's bank account; while in another example, the funds are sourced directly from the account of the company providing the roadside assistance program. Meanwhile, in another example a first person (e.g., a parent) may arrange for a second person (e.g., their child) to authorize release of the parent's funds to the service provider. The server 108 may also notify the service provider's server 110 that payment has been authorized. As such, service provider may receive more prompt payment for its services, while also reducing the need to process claims at the insurance company.

Vehicle Incident. In yet another example in accordance with various aspects of the invention, two user vehicles may be involved in a vehicular crash. In such a scenario, the two users may exchange insurance information and other information (e.g., pictures of the crash site taken with a camera on the mobile device 102) wirelessly using their mobile device 102. For example, an application in accordance with various aspects of the invention may enable the users to wirelessly transmit (e.g., using Bluetooth, SMS messaging, e-mail, or other wireless transmission techniques) their information to the other user's mobile device. At least one benefit is that the exchange of information between the parties is much more convenient given the stressful situation of a vehicular crash.

Preventive Measures. As explained earlier, vehicles with onboard diagnostic equipment (e.g., OBD II port) may be able to retrieve information about operating parameters of the user's vehicle. As such, the diagnostic equipment may be able to assist the user in the maintenance and upkeep of the vehicle; thus, resulting in a safer vehicle and hopefully fewer incidents. The mobile device 102 may receive alert notifications when parameters of the vehicle are outside of normal operating limits or limits set by the user or other entity. For example, if the user's battery is dead or low, the user may receive a notification on the mobile device 102 (or elsewhere designated by the user) about the dead or failing car battery. Likewise, if the vehicle's tire pressure runs low, the mobile device 102 may receive a notification. Along with the notification, the mobile device 102 may be provided with one or more service providers (e.g., towing companies, mechanics shops, or other providers) that can repair the problem.

Referring to FIG. 3, the flowchart illustrates various features of the one or more embodiments of the invention. The user may register using the mobile device 102, or may, in some embodiments, register online with a personal computer. Once the user is registered, information about the user (e.g., user profile information) may be stored on the mobile device 102 (or on a remote server 108). That information may be useful in storing and displaying information about the user, including a picture of the user's vehicle, make/model/year of the vehicle, vehicle's insurance policy (or motor club) number (e.g., virtual membership card), and other pertinent information. In some embodiments, the user may only be "pre-registered" 302 (i.e., registered with the application with some basic information (e.g., name, vehicle, phone number, etc.), but may not have a membership in a roadside assistance program); thus, features such as the virtual membership card may be grayed out (i.e., deactivated) on the user's screen. However, in one example, the pre-registered user may provide the application with some basic authentication information (e.g., last four digits of social security number, date of birth, and/or membership number) to authenticate herself, and then need only provide 304 some minimal additional authorization information (e.g., credit card information, vehicle information, driver information, etc.) to activate/register 306 for membership in the roadside assistance program. At least one benefit of pre-registration is that a user can go through the lengthy registration process in advance, and then at the time of a roadside event (e.g., car crash), the user can activate the pre-registration for membership privileges with minimal hassle.

As explained earlier, vehicles with onboard diagnostic equipment (e.g., OBD II port) may be able to retrieve information about operating parameters of the user's vehicle. As such, the diagnostic equipment may be able to assist the user in the maintenance and upkeep of the vehicle; thus, resulting in a safer vehicle and hopefully fewer incidents. The mobile device 102 may receive alert notifications when parameters of the vehicle are outside of normal operating limits or limits set by the user or other entity. For example, if the user's battery is dead or low, the user may receive a notification on the mobile device 102 (or elsewhere designated by the user) about the dead or failing car battery. Likewise, if the vehicle's tire pressure runs low, the mobile device 102 may receive a notification. Along with the notification, the mobile device 102 may be provided with one or more service providers (e.g., towing companies, mechanics shops, or other providers) that can repair the problem.

Referring to FIG. 3, the flowchart illustrates various features of the one or more embodiments of the invention. The user may register using the mobile device 102, or may, in some embodiments, register online with a personal computer. Once the user is registered, information about the user (e.g., user profile information) may be stored on the mobile device 102 (or on a remote server 108). That information may be useful in storing and displaying information about the user, including a picture of the user's vehicle, make/model/year of the vehicle, vehicle's insurance policy (or motor club) number (e.g., virtual membership card), and other pertinent information. In some embodiments, the user may only be "pre-registered" 302 (i.e., registered with the application with some basic information (e.g., name, vehicle, phone number, etc.), but may not have a membership in a roadside assistance program); thus, features such as the virtual membership card may be grayed out (i.e., deactivated) on the user's screen. However, in one example, the pre-registered user may provide the application with some basic authentication information (e.g., last four digits of social security number, date of birth, and/or membership number) to authenticate herself, and then need only provide 304 some minimal additional authorization information (e.g., credit card information, vehicle information, driver information, etc.) to activate/register 306 for membership in the roadside assistance program. At least one benefit of pre-registration is that a user can go through the lengthy registration process in advance, and then at the time of a roadside event (e.g., car crash), the user can activate the pre-registration for membership privileges with minimal hassle.

One of ordinary skill in the art will understand that the flowcharts illustrate just some examples of functions/features available in accordance with various aspects of the invention, and that other examples of features are available as described throughout the specification and figures. For example, various aspects of the invention include a feature for obtaining customer feedback. The feature enables prompt and accurate feedback about the user's experience because, inter alia, the feedback is collected almost immediately after the event of interest, and the questions can be tailored to the specifics of the particular event/user/details.

Regarding user vehicle registration, the user may enter various information to register for enhanced roadside assistance. In some embodiments, the user may enter just the vehicle VIN (vehicle identification number). The server 108 and/or mobile device 102 may store the VIN and retrieve information about the vehicle (e.g., made, model, year, etc.) based off the VIN. In an alternative embodiment, the user may also be required to enter membership information, such as name, zip code, or a member identification number. The membership information may be linked to the user's insurance or motor club profile and mapped as such on server 108. As a result, future communications between the mobile device 102 and the server 108 may be recognized as related to a particular member. Membership may refer to membership in a roadside assistance program, motor club, or other group/organization.

Figure 4:
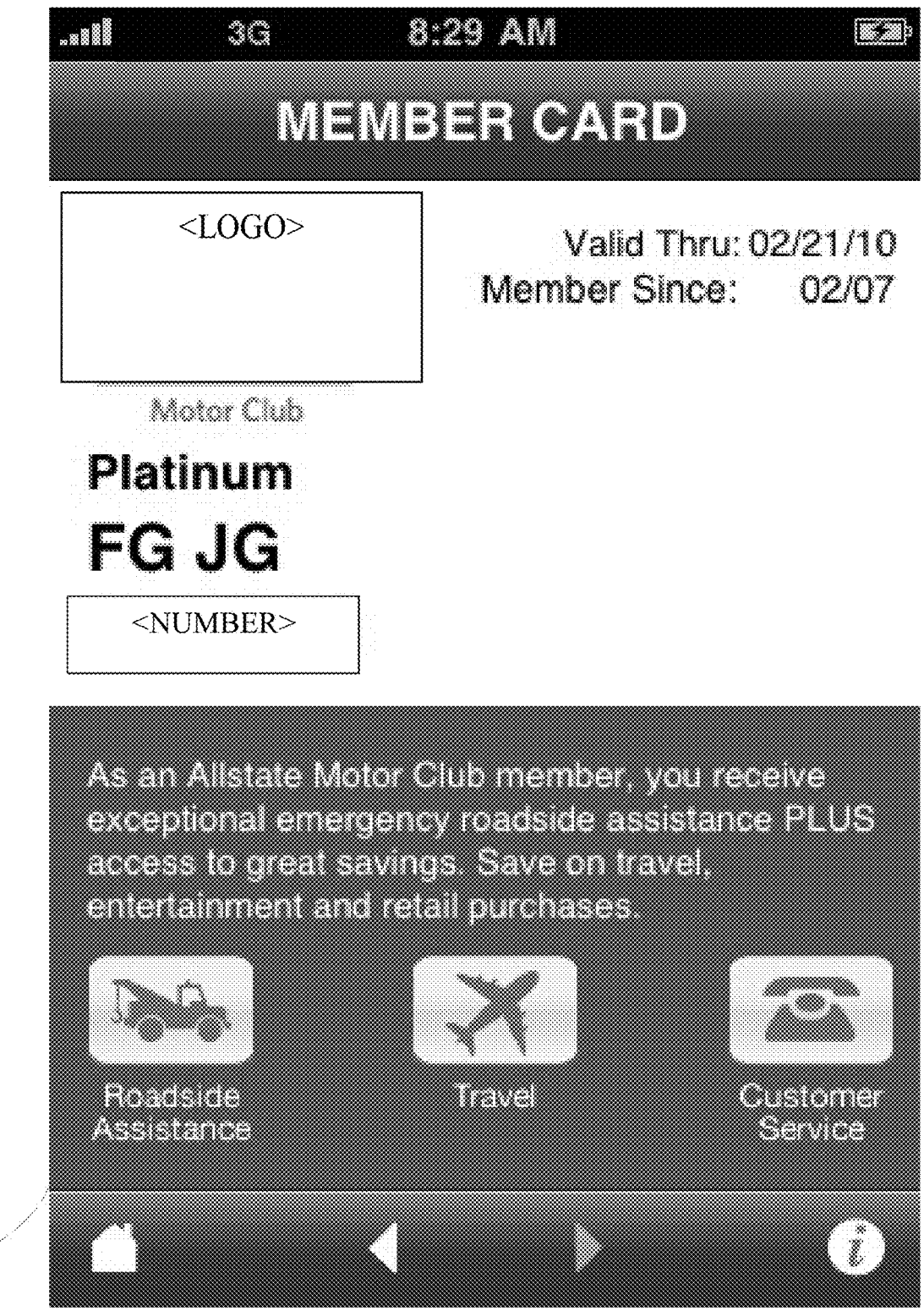
FIGS. 4-6 illustrate exemplary screenshots of an application for roadside assistance in accordance with various aspects of the invention.

Electronic Membership Card. Membership information may be illustrated in an exemplary virtual membership card screen, as depicted in FIG. 4. The member card screen 400 may illustrate the date through which the user's membership is valid and/or the date since the user has been a member. The user's membership number, membership level (e.g., Platinum), and other information may also be displayed on the membership card screen. At least some of the information displayed on the membership card screen may be locally stored on the mobile device 102. As such, the user need not be connected to a carrier or WiFi in order to retrieve his/her membership information. Alternatively, membership information may be stored on a server 108 and retrieved for display on the screen. At least one benefit of an electronic membership card is that changes to the user's policy and/or other updates may be dynamically pushed to the user's mobile device 102. As such, the user may have instant access to updated policy information and need not necessarily wait for an insurance company to mail him/her an updated membership card. In addition, the membership card screen may include information about services and promotions offered to members. For example, a roadside assistance icon may appear to indicate that roadside assistance on the go is available to the user. In addition, promotions and discounts, for example on travel (e.g., flights, rental cars, hotels, etc.) may be available to members and a corresponding icon or information may appear on the membership card screen accordingly.

Meanwhile, a service provider may also be provided with a registration screen in some embodiments in accordance with aspects of the invention. Service provider vehicles may be equipped with wireless-enabled devices (e.g., navigation systems with Internet connectivity) that permit the vehicle operator to react in realtime to service requests. For example, the exact location of the service vehicle can be tracked using this onboard device.

Enhanced Interactive Voice Response (IVR). In an alternative embodiment, information from the application on the mobile device 102 may be transmitted to a remote server related to an IVR system. For wireless devices 102 with a mobile data plan, the information may be transmitted over a wireless Internet connection. However, in those instances where the mobile device does not have data connectivity, the device may transmit the data to the IVR system using other available means. For example, in one embodiment, the information may be transmitted as a SMS (or comparable text message format) message to the IVR system. As a result, when a user calls into the IVR system, the user may receive an enhanced experience because the user's location and other relevant information may already be available at the IVR system. The IVR may, in some embodiments, still confirm for security reasons the name of the member, zip code of the member, and service requested before transferring the user to a service provider. The disclosed enhanced IVR is beneficial because it alleviates the requirement to have the user listen to endless prompts and respond with touchtone key presses. In some examples, if the user wishes to speak with a customer service representative, he/she may press "0" (or other designated key) to immediately speak with a representative.

Other features in accordance with various aspects of the invention are listed below. For example, server 108 may generate a user driving score based on the user's reactions to communications and recommendations from an insurance company or a motor club. The driving score may be used to adjust the user's insurance premiums or membership dues and/or other aspects of the user's insurance policy or motor club membership. In another example, the mobile device 102 may provide the user with information regarding the relative safety of proposed navigation routes as, for example, is described in the provisional applications, which were previously incorporated by reference in their entireties. In yet another example, the mobile device 102 may provide different color-coded zones on a map to indicate the relative safety of various areas. For example, the mobile device 102 may alert the user that a particular intersection is particularly hazardous and has a statistically higher frequency of vehicle incidents. One or more of these features may be provided in accordance with various aspects of the invention. In yet another example, the mobile device may provide the user with information regarding the relative safety of drivers or vehicles in the vicinity of the user. This information may be provided through transmission of scores or other data regarding the drivers or vehicles in the vicinity of the user.

In one embodiment in accordance with aspects of the invention, a system is described where two servers and a mobile device assist in providing roadside assistance. The mobile device may communicate with a first server and provide various information about the status of a vehicle, the user, and/or other information. The first server may communicate with a second server to electronically request, approve, and monitor a service provider hired to service the vehicle. The first server may provide information and/or regular updates to the mobile device regarding the service provider. The first server may also authorize payment to the service provider once the job is completed. One or more aspects of the aforementioned embodiment are described in greater detail throughout the disclosure.

In accordance with aspects of the invention, a new set of pricing tiers are disclosed herein for enabling safe driving and lower rates for insurance policy customers. In addition, various approaches to helping users mitigate risk are presented. In accordance with aspects of the invention, a computing device is disclosed for generating risk values in a data store. The system may receive various types of information, including but not limited to, accident information, geographic information, and vehicle information, from one or more data sources and calculate a risk value for associated road segments. Subsequently, the computing device may provide the associated risk value when provided with location information for a road segment such as regional location information and/or other information.

In an alternate embodiment in accordance with aspects of the invention, a personal navigation device, mobile device, and/or personal computing device may communicate with the database of risk values. The devices may receive information about a travel route and use that information to retrieve risk values for road segments in the travel route. The aggregate of the risk values is sent for display on a screen of the device or for recording in memory of the device. The contents of memory may also be uploaded to a data store for use by, e.g., insurance companies, to determine whether to adjust a quote for insurance coverage or one or more aspects of current insurance coverage such as premium, specific coverages, specific exclusions, rewards, special terms, etc.

In yet another embodiment, in accordance with aspects of the invention, a personal navigation device, mobile device, and/or personal computing device may access the database of risk values to assist in identifying and presenting alternate low-risk travel routes. The driver may select among the various travel routes presented, taking into account his/her tolerance for risk. Depending on the driver's selection, the vehicle's insurance policy may be adjusted accordingly, for either the current insurance policy or a future insurance policy.

Figure 7:
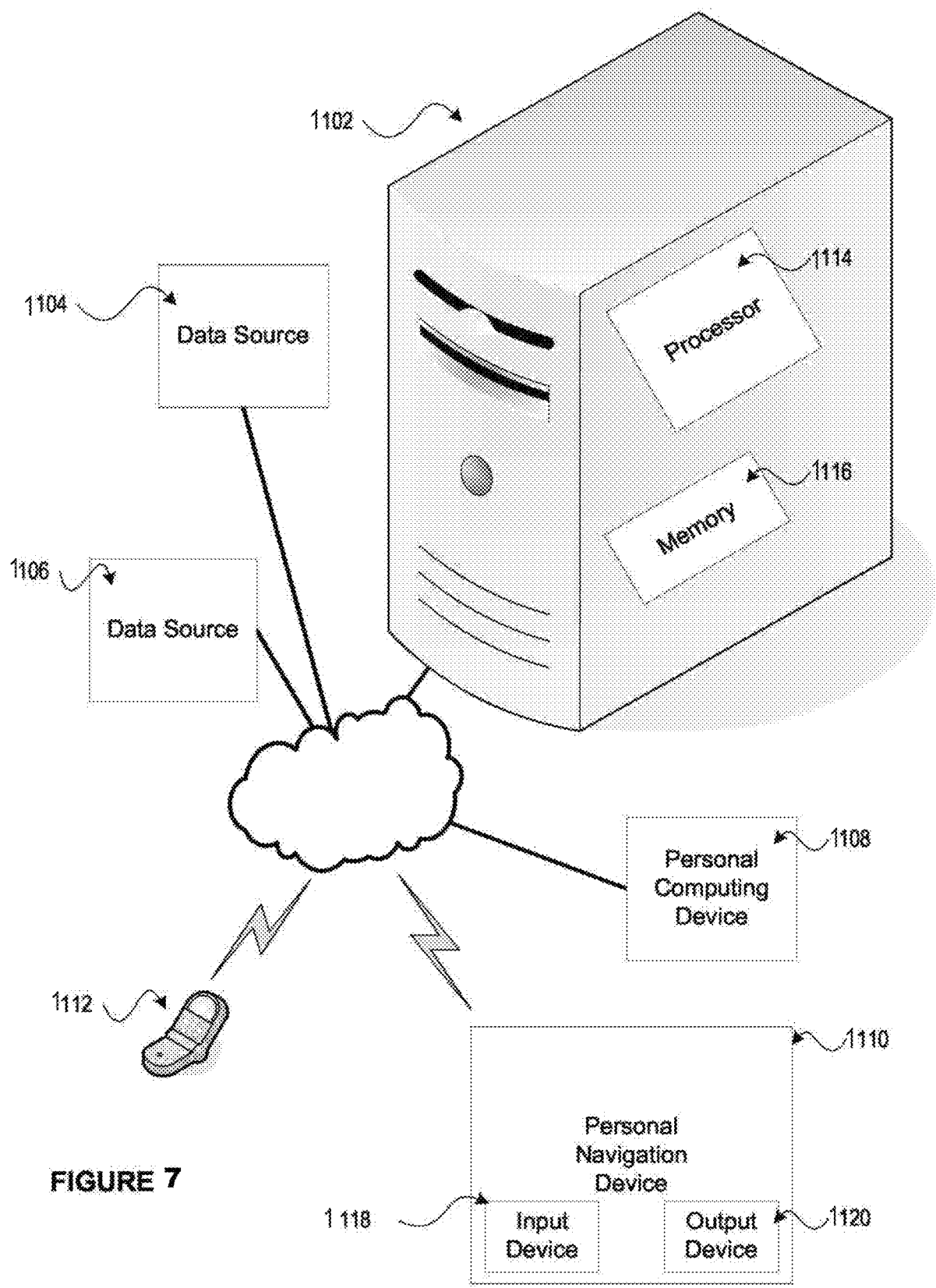
FIG. 7 depicts an illustrative operating environment in accordance with aspects of the invention.

Referring to FIG. 7, an example of a suitable operating environment in which various aspects of the invention may be implemented is shown in the architectural diagram of FIG. 7. The operating environment is only one example of a suitable operating environment and is not intended to suggest any limitation as to the scope of use or functionality of the invention. The operating environment may be comprised of one or more data sources 1104, 1106 in communication with a computing device 1102. The computing device 1102 may use information communicated from the data sources 1104, 1106 to generate values that may be stored in a conventional database format. In one embodiment, the computing device 1102 may be a high-end server computer with one or more processors 1114 and memory 1116 for storing and maintaining the values generated. The memory 1116 storing and maintaining the values generated need not be physically located in the computing device 1102. Rather, the memory (e.g., ROM, flash memory, hard drive memory, RAID memory, etc.) may be located in a remote data store (e.g., memory storage area) physically located outside the computing device 1102, but in communication with the computing device 1102.

A personal computing device 1108 (e.g., a personal computer, tablet PC, handheld computing device, personal digital assistant, mobile device, etc.) may communicate with the computing device 1102. Similarly, a personal navigation device 1110 (e.g., a global positioning system (GPS), geographic information system (GIS), satellite navigation system, mobile device, other location tracking device, etc.) may communicate with the computing device 1102. The communication between the computing device 1102 and the other devices 1108, 1110 may be through wired or wireless communication networks and/or direct links. One or more networks may be in the form of a local area network (LAN) that has one or more of the well-known LAN topologies and may use a variety of different protocols, such as Ethernet. One or more of the networks may be in the form of a wide area network (WAN), such as the Internet. The computing device 1102 and other devices (e.g., devices 1108, 1110) may be connected to one or more of the networks via twisted pair wires, coaxial cable, fiber optics, radio waves or other media. The term "network" as used herein and depicted in the drawings should be broadly interpreted to include not only systems in which devices and/or data sources are coupled together via one or more communication paths, but also stand-alone devices that may be coupled, from time to time, to such systems that have storage capability.

In another embodiment in accordance with aspects of the invention, a personal navigation device 1110 may operate in a stand-alone manner by locally storing some of the database of values stored in the memory 1116 of the computing device 1102. For example, a personal navigation device 1110 (e.g., a GPS in an automobile) may be comprised of a processor, memory, and/or input devices 1118/output devices 1120 (e.g., keypad, display screen, speaker, etc.). The memory may be comprised of a non-volatile memory that stores a database of values used in calculating an estimated route risk for identified routes. Therefore, the personal navigation device 1110 need not communicate with a computing device 1102 located at, for example, a remote location in order to calculate identified routes. Rather, the personal navigation device 1110 may behave in a stand-alone manner and use its processor to calculate route risk values of identified routes. If desired, the personal navigation device 1110 may be updated with an updated database of values after a period of time (e.g., an annual patch with new risk values determined over the prior year).

In yet another embodiment in accordance with aspects of the invention, a personal computing device 1108 may operate in a stand-alone manner by locally storing some of the database of values stored in the memory 1116 of the computing device 1102. For example, a personal computing device 1108 may be comprised of a processor, memory, input device (e.g., keypad, CD-ROM drive, DVD drive, etc.), and output device (e.g., display screen, printer, speaker, etc.). The memory may be comprised of CD-ROM media that stores values used in calculating an estimated route risk for an identified route. Therefore, the personal computing device A108 may use the input device to read the contents of the CD-ROM media in order to calculate a value for the identified route. Rather, the personal computing device A108 may behave in a stand-alone manner and use its processor to calculate a route risk value. If desired, the personal computing device 1108 may be provided with an updated database of values (e.g., in the form of updated CD-ROM media) after a period of time. One skilled in the art will appreciate that personal computing device 1108, 1110, 1112 need not be personal to a single user; rather, they may be shared among members of a family, company, etc.

The data sources 1104, 1106 may provide information to the computing device 1102. In one embodiment in accordance with aspects of the invention, a data source may be a computer which contains memory storing data and is configured to provide information to the computing device 1102. Some examples of providers of data sources in accordance with aspects of the invention include, but are not limited to, insurance companies, third-party insurance data providers, government entities, state highway patrol departments, local law enforcement agencies, state departments of transportation, federal transportation agencies, traffic information services, road hazard information sources, construction information sources, weather information services, geographic information services, vehicle manufacturers, vehicle safety organizations, and environmental information services. For privacy protection reasons, in some embodiments of the invention, access to the information in the data sources 1104, 1106 may be restricted to only authorized computing devices 1102 and for only permissible purposes. For example, access to the data sources 1104, 1106 may be restricted to only those persons/entities that have signed an agreement (e.g., an electronic agreement) acknowledging their responsibilities with regard to the use and security to be accorded this information.

The computing device 1102 uses the information from the data sources 1104, 1106 to generate values that may be used to calculate an estimated route risk. Some examples of the information that the data sources 1104, 1106 may provide to the computing device 1102 include, but are not limited to, accident information, geographic information, and other types of information useful in generating a database of values for calculating an estimated route risk.

Some examples of accident information include, but are not limited to, loss type, applicable insurance coverage(s) (e.g., bodily injury, property damage, medical/personal injury protection, collision, comprehensive, rental reimbursement, towing), loss cost, number of distinct accidents for the segment, time relevancy validation, cause of loss (e.g., turned left into oncoming traffic, ran through red light, rear-ended while attempting to stop, rear-ended while changing lanes, sideswiped during normal driving, sideswiped while changing lanes, accident caused by tire failure (e.g., blow-out), accident caused by other malfunction of car, rolled over, caught on fire or exploded, immersed into a body of water or liquid, unknown, etc.), impact type (e.g., collision with another automobile, collision with cyclist, collision with pedestrian, collision with animal, collision with parked car, etc.), drugs or alcohol involved, pedestrian involved, wildlife involved, type of wildlife involved, speed of vehicle at time of incident, direction the vehicle is traveling immediately before the incident occurred, date of incident, time of day, night/day indicator (i.e., whether it was night or day at the time of the incident), temperature at time of incident, weather conditions at time of incident (e.g., sunny, downpour rain, light rain, snow, fog, ice, sleet, hail, wind, hurricane, etc.), road conditions at time of incident (e.g., wet pavement, dry pavement, etc.), and location (e.g., geographic coordinates, closest address, zip code, etc.) of vehicle at time of incident.

Accident information associated with vehicle accidents may be stored in a database format and may be compiled per segment. One skilled in the art will understand that the term segment may be interchangeably used to describe a road segment, intersection, round about, bridge, tunnel, ramp, parking lot, railroad crossing, or other feature that a vehicle may encounter along a route.

Time relevancy validation relates to the relevancy of historical accident information associated with a particular location. Time relevancy validation information may be dynamically created by comparing the time frames of accident information to the current date. For example, if a location or route had many collisions prior to five years ago but few since, perhaps a road improvement reduced the risk (such as adding a traffic light). Time relevancy information may be generated remotely and transmitted by a data source 1104, 1106 to the computing device 1102 like other information. Alternatively, time relevancy information may be calculated at the computing device 1102 using other information transmitted by a data source 1104, 1106. For example, the appropriateness of historical information may be related to the time frame into which the information belongs. Examples of time frames may include, but are not limited to, less than 1 year ago, 1 year ago, 2 years ago, 3 years ago, 4 years ago, 5 to 10 years ago, and greater than 10 years ago. In one embodiment, the more recent the historical information, the greater weight is attributed to the information.

Some examples of geographic information include, but are not limited to, location information and attribute information. Examples of attribute information include, but are not limited to, information about characteristics of a corresponding location described by some location information: posted speed limit, construction area indicator (i.e., whether location has construction), topography type (e.g., flat, rolling hills, steep hills, etc.), road type (e.g., residential, interstate, 4-lane separated highway, city street, country road, parking lot, etc.), road feature (e.g., intersection, gentle curve, blind curve, bridge, tunnel), number of intersections, whether a roundabout is present, number of railroad crossings, whether a passing zone is present, whether a merge is present, number of lanes, width of road/lanes, population density, condition of road (e.g., new, worn, severely damaged with sink-holes, severely damaged with erosion, gravel, dirt, paved, etc.), wildlife area, state, county, and/or municipality. Geographic information may also include other attribute information about road segments, intersections, bridges, tunnels, railroad crossings, and other roadway features.

Location information for an intersection may include the latitude and longitude (e.g., geographic coordinates) of the geometric center of the intersection. The location may be described in other embodiments using a closest address to the actual desired location or intersection. The intersection (i.e., location information) may also include information that describes the geographic boundaries, for example, of the intersection which includes all information that is associated within a circular area defined by the coordinates of the center of the intersection and points within a specified radius of the center. In another example of location information, a road segment may be defined by the latitude and longitude of its endpoints and/or an area defined by the road shape and a predetermined offset that forms a polygon. Segments may comprise intersections, bridges, tunnels, rail road crossings or other roadway types and features. Those skilled in the art will recognize that segments can be defined in many ways without departing from the spirit of this disclosed invention.

Some examples of vehicle information include, but are not limited to, information that describes vehicles that are associated with incidents (e.g., vehicle accidents, etc.) at a particular location (e.g., a location corresponding to location information describing a segment, intersection, etc.) Vehicle information may include vehicle make, vehicle model, vehicle year, and age. Vehicle information may also include information collected through one or more in-vehicle devices or systems such as an event data recorder (EDR), onboard diagnostic system, or global positioning satellite (GPS) device; examples of this information include speed at impact, brakes applied, throttle position, direction at impact. As is clear from the preceding examples, vehicle information may also include information about the driver of a vehicle being driven at the time of an incident. Other examples of driver information may include age, gender, marital status, occupation, alcohol level in blood, credit score, distance from home, cell phone usage (i.e., whether the driver was using a cell phone at the time of the incident), number of occupants.

In one embodiment in accordance with aspects of the invention, a data source 1104 may provide the computing device 1102 with accident information that is used to generate values (e.g., create new values and/or update existing values). The computing device 1102 may use at least part of the received accident information to calculate a value, associate the value with a road segment (or other location information), and store the value in a database format. One skilled in the art will appreciate, after thorough review of the entirety disclosed herein, that there may be other types of information that may be useful in generating a database of values for use in, among other things, calculating an estimated route risk.

For example, in accordance with aspects of the invention, a data source 1104 may provide the computing device 1102 with geographic information that is used to generate new roadway feature risk values in a database of risk values and/or update existing risk values; where the roadway feature may comprise intersections, road segments, tunnels, bridges, or railroad crossings. Attributes associated with roadways may also be used in part to generate risk values. The computing device 1102 may use at least part of the received geographic information to calculate a value, associate the value with a road segment (or other location information), and store the value in a database format. Numerous examples of geographic information were provided above. For example, a computing device 1102 may receive geographic information corresponding to a road segment comprising accident information and roadway feature information and then calculate a risk value. Therefore, when calculating a risk value, the system may use, in one example, the geographic information and the accident information (if any accident information is provided). In alternative embodiments in accordance with aspects of the invention, the computing device may use accident information, geographic information, vehicle information, and/or other information, either alone or in combination, in calculating risk values in a database format.

The values generated by the computing device 1102 may be associated with a road segment containing the accident location and stored in a data store. Similar to a point of interest (POI) stored in GPS systems, a point of risk (POR) is a road segment or point on a map that has risk information associated with it. Points of risk may arise because incidents (e.g., accidents) have occurred at these points before. In accordance with aspects of the invention, the road segment may be a predetermined length (e.g., ¼ mile) on a stretch of road. Alternatively, road segments may be points (i.e., where the predetermined length is minimal) on a road. Furthermore, in some embodiments, road segment may include one or more different roads that are no farther than a predetermined radius from a road segment identifier. Such an embodiment may be beneficial in a location, for example, where an unusually large number of streets intersect, and it may be impractical to designate a single road for a road segment.

Figure 8:
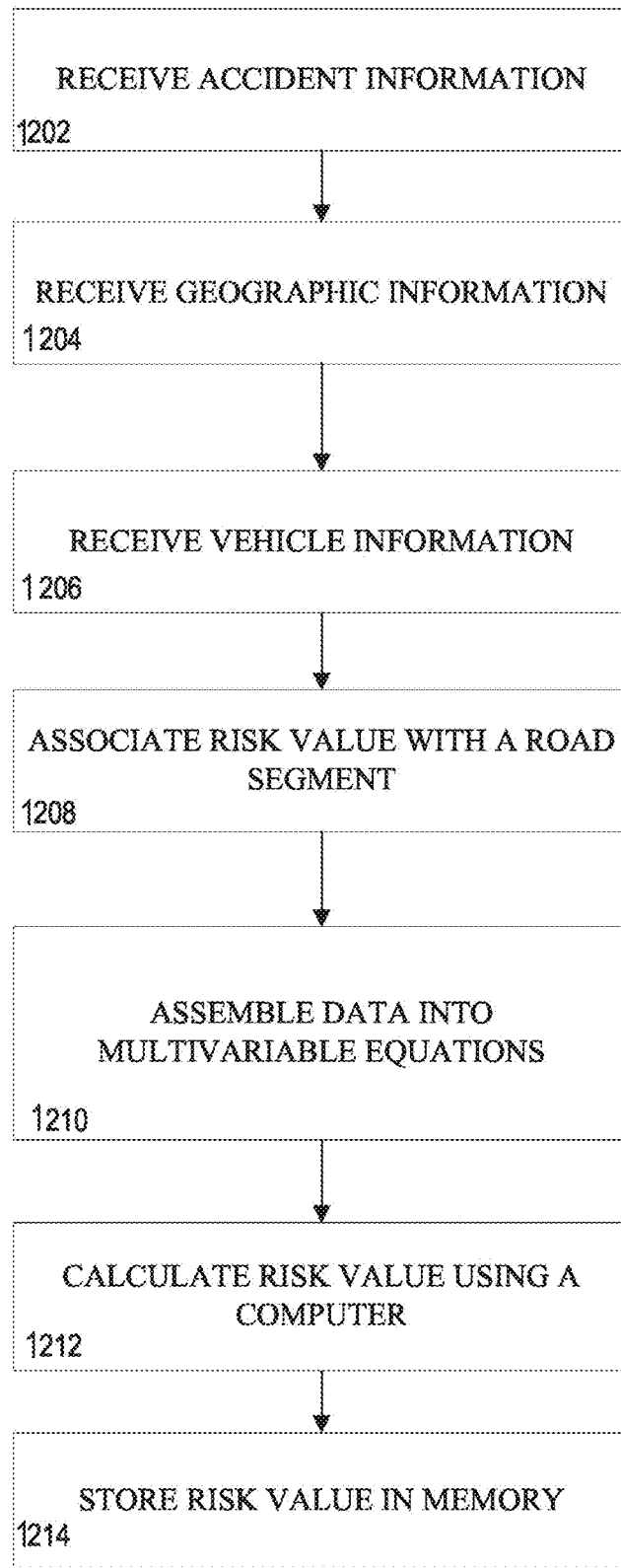
FIG. 8 depicts illustrative steps for calculating the risk value of a route segment by applying actuarial and/or statistical methods in accordance with aspects of the invention.

Referring to FIG. 8, in accordance with aspects of the invention, a computing device 1102 may receive accident information (in step 1202), geographic information (in step 1204), and/or vehicle information (in step 1206). The computing device 1102 may calculate (in step 1212) the risk value for a road segment (or point of risk) by applying actuarial techniques to the information that may be received from data sources 1104, 1106. In one embodiment, the computing device 1102 receives and stores the accident information in a data store with the latitude/longitude and time of the incident. The accident data is associated with a location and combined with other accident data associated with the same location (in step 1210). Applying actuarial and/or statistical modeling techniques involving multiple predictors, such as generalized linear models and non-linear models, a risk value may be calculated (1212), and the calculated risk value may be recorded in memory (1116) (in step 1214). The multiple predictors involved in the statistical model used to calculate a risk value may include accident information, geographic information, and vehicle information. Associating the risk value (in step 1208) with a line segment and/or point which best pinpoints the area of the road in which the incident(s) occurred may be accomplished by using established GIS locating technology (e.g., GPS ascertaining a geographically determinable address, and assigning the data file to a segment's or intersection's formal address determined by the system). For example, two or more accidents located in an intersection or road segment may have slightly different addresses depending on where within the intersection or segment the accident location was determined to be. Therefore, the system may identify a location based on business rules. In another example business rules may identify an incident location using the address of the nearest intersection. In yet another example the system may identify the location of an incident on a highway using segments based on mileage markers or the lengths may be dynamically determined by creating segment lengths based on relatively equal normalized risk values. Therefore, roadways that have stretches with higher numbers of accidents may have shorter segments than stretches that have fewer accidents. In another example, if the incident occurred in a parking lot, the entire parking lot may be associated with a formal address that includes all accidents located within a determined area. One skilled in the art will appreciate after review of the entirety disclosed that road segment includes a segment of road, a point on a road, and other designations of a location (e.g., an entire parking lot).

For example, an insurance claim-handling processor may collect data about numerous incidents such as collision, theft, weather damage, and other events that cause any one of (or combination of) personal injury, vehicle damage, and damage to other vehicles or property. Information about the accident may be collected through artifacts such as first notice of loss (FNOL) reports and claim adjuster reports and may be stored in one or more data stores used by the insurer. Other data may also be collected at the point and time when the incident occurred, and this information (e.g., weather conditions, traffic conditions, vehicle speed, etc.) may be stored with the other accident information. The information in these data stores may be distributed by data sources 1104, 1106 in accordance with aspects of the invention. In addition, some information may also be recorded in third-party data sources that may be accessible to one or more insurance companies. For example, traffic information (e.g., traffic volume) and weather information may be retrieved in real-time (or near real-time) from their respective data sources.

Figure 9:
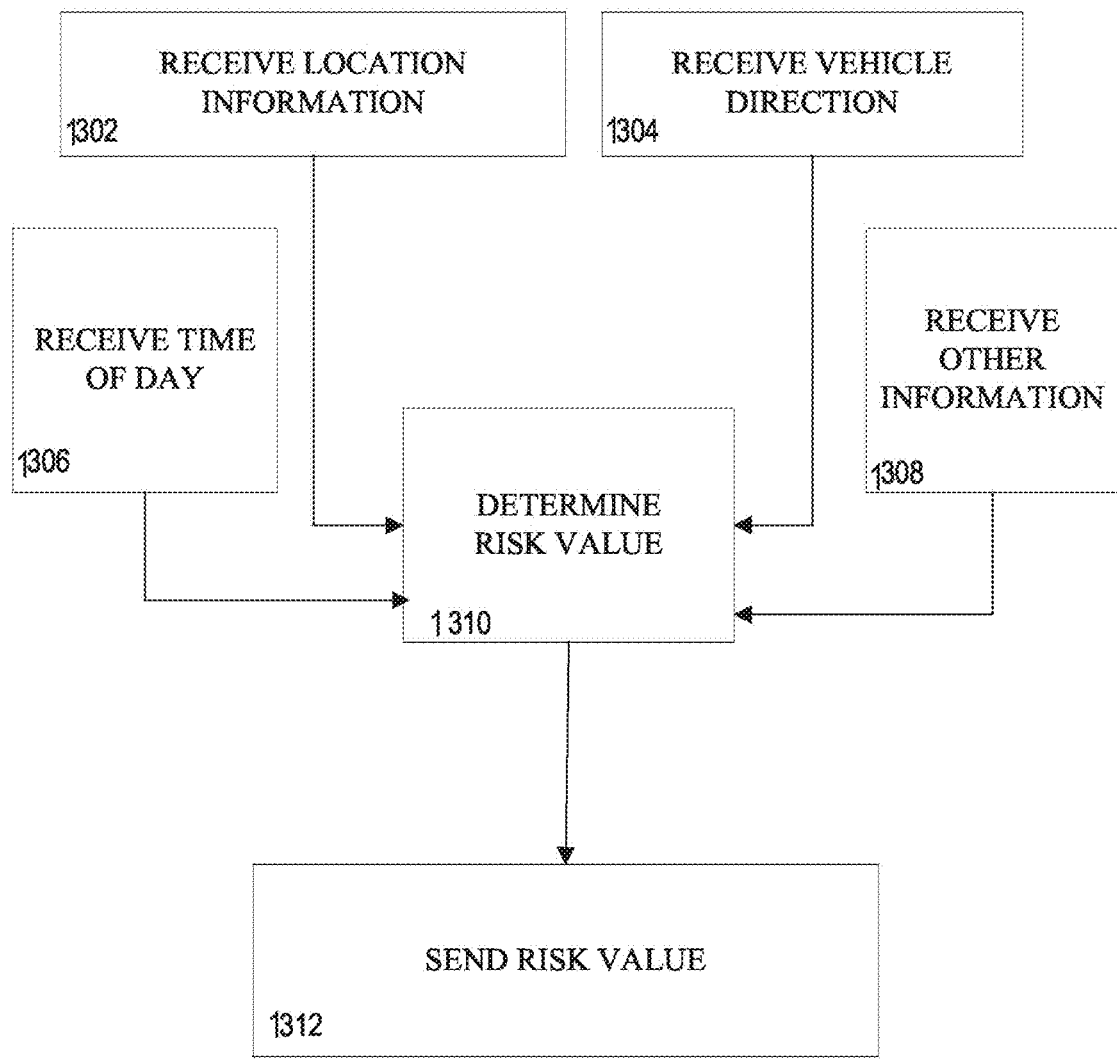
FIG. 9 depicts illustrative steps for determining and providing risk values to a computing device in accordance with aspects of the invention.

Referring to FIG. 9, in accordance with aspects of the invention, the computing device 1102 may send (in step 1312) the risk value corresponding to a road segment when it receives location information (in step 1302) requesting the risk associated with a particular location. The particular location information may be in the form of longitude/latitude coordinates, street address, intersection, closest address, or other form of information. Furthermore, in an alternative embodiment the accuracy of the risk value may be improved by submitting the direction that a vehicle travels (or may travel) through a road segment. The computing device 1102 may receive (in step 1304) the vehicle direction and use it to determine the risk value associated with the vehicle route. For example, a dangerous intersection demonstrates high risk to a vehicle/driver that passes through it. However, actuarial analysis (e.g., of data showing many recorded accidents at the location) may show that it is more dangerous if the driver is traveling northbound on the road segment and turns left. Therefore, the vehicle direction may also be considered when retrieving the appropriate risk value (in step 1310).

Likewise, the computing device 1102 may also receive (in step 1308) other information to enhance the accuracy of the risk value associated with a travel route. For example, the computing device 1102 may receive (in step 1306) the time of day when the driver is driving (or plans to drive) through a particular travel route. This information may improve the accuracy of the risk value retrieved (in step 1310) for the travel route. For example, a particular segment of road through a wilderness area may have a higher rate of accidents involving deer during the night hours, but no accidents during the daylight hours. Therefore, the time of day may also be considered when retrieving the appropriate risk value (in step 1310). In addition, the computing device may receive (in step 1308) other information to improve the accuracy of the risk value retrieved (in step 1310) for a travel route. Some examples of this other information include, but are not limited to, the vehicle's speed (e.g., a vehicle without a sport suspension attempting to take a dangerous curve at a high speed), vehicle's speed compared to the posted speed limit, etc.

In accordance with aspects of the invention, a computer-readable medium storing computer-executable instructions for performing the steps depicted in FIGS. 8 and 9 and/or described in the present disclosure is contemplated. The computer-executable instructions may be configured for execution by a processor (e.g., processor 1114 in computing device 1102) and stored in a memory (e.g., memory 1116 in computing device 1102). Furthermore, as explained earlier, the computer-readable medium may be embodied in a non-volatile memory (e.g., in a memory in personal navigation device 1110) or portable media (e.g., CD-ROM, DVD-ROM, USB flash, etc. connected to personal computing device 1108).

In accordance with aspects of the invention, a personal navigation device 1110 may calculate a route risk value for a travel route of a vehicle. The personal navigation device 1110 may be located, for example, in a driver's vehicle or in a mobile device 1112 with location tracking capabilities. Alternatively, a personal computing device 1108 may be used to calculate the route risk value for a travel route of a vehicle.

Figure 10:
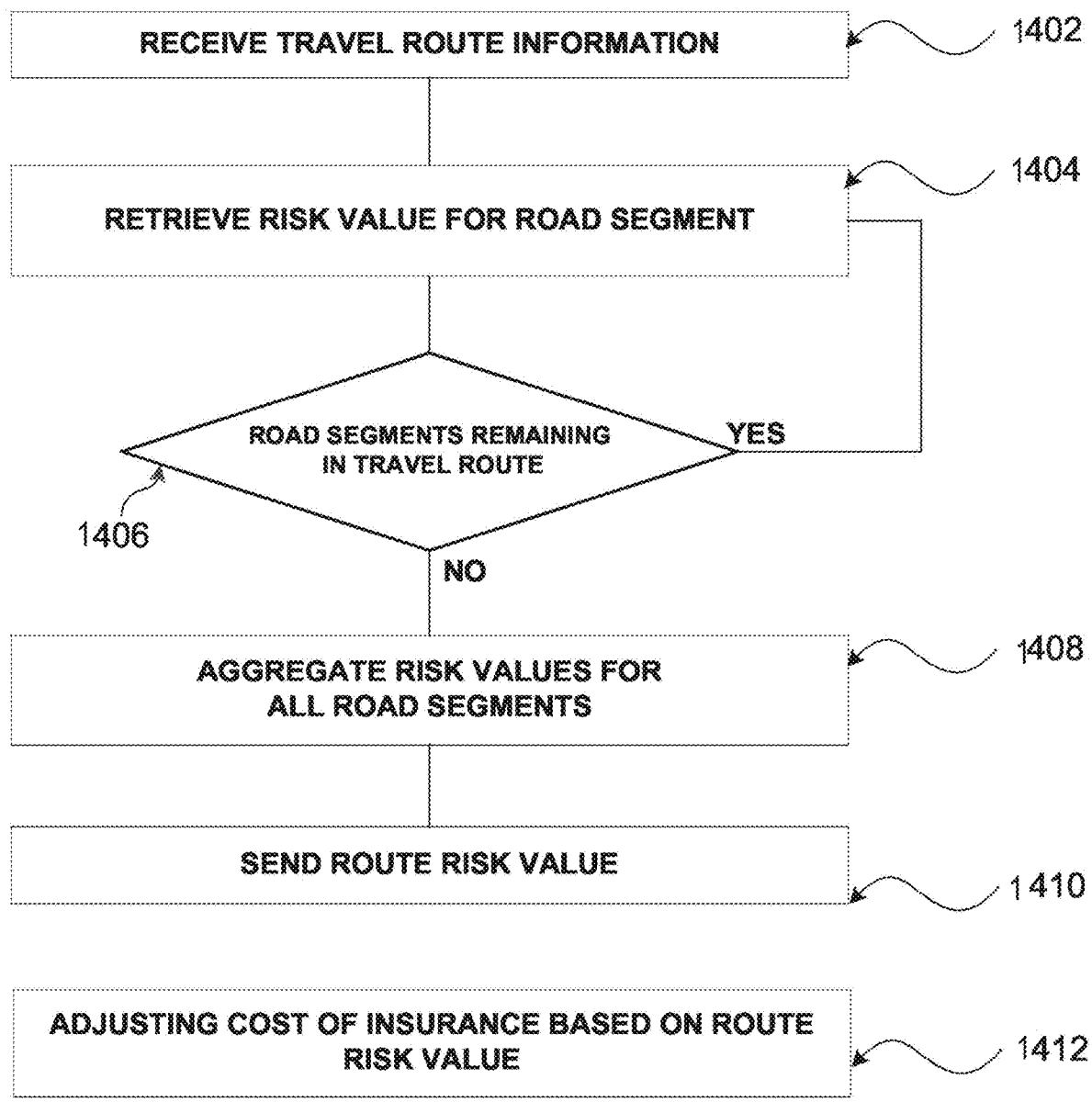
FIG. 10 depicts illustrative steps for calculating the risk value of a travel route in accordance with aspects of the invention.

For example, referring to FIG. 10, a personal navigation device 1110 may receive (in step 1402) travel route information. The travel route information may include, but is not limited to, a start location, end location, road-by-road directions, and/or turn-by-turn directions. The personal navigation device 1110 may use the travel route information and mapping software to determine the road segment upon which the vehicle will travel, and retrieve (in step 1404) the risk value for that road segment. For each subsequent road segment remaining in the travel route (see step 1406), the personal navigation device 1110 may access the database of risk values to retrieve (in step 1404) the risk value for that road segment. As explained earlier, the database of risk values may be stored locally to the personal navigation device 1110, or may be stored remotely and accessed through a wired/wireless link to the data store.

The risk values retrieved (in step 1404) for the travel route may be aggregated (in step 1408) and a total risk value for the travel route may be sent (in step 1410). In an alternate embodiment, the computing device 1102 may count the number of each type of road risk along the travel route based on the values stored in the database. This number may then be multiplied by a risk-rating factor for the respective risk type. A risk type may comprise intersections, locations of past accidents along a route, railroad crossings, merges, roadway class (residential, local, commercial, rural, highways, limited access highways). Other risk types may include proximity to businesses that sell alcohol, churches or bingo parlors.

The sum of this product overall risk types may, in this alternate embodiment, equal the total route risk value. The total route risk value may be divided by the distance traveled to determine the route risk category for the travel route. For example, a route risk category may be assigned based on a set of route risk value ranges for low, medium, and high risk routes.

After being aggregated, the total risk value may be sent (in step 1410) to a viewable display on the personal navigation device 1110. Alternatively, the total risk value may be sent (in step 1410) to a local/remote memory where it may be recorded and/or monitored. For example, it may be desirable for a safe driver to have her total risk value for all travel routes traveled over a time period to be uploaded to an insurance company's data store. The insurance company may then identify the driver as a lower-risk driver (e.g., a driver that travels on statistically lower-risk routes during lower-risk times) and provide the driver/vehicle with a discount and/or credit (in step 1412) on an existing insurance policy (or towards a future insurance policy). At least one benefit of the aforementioned is that safe drivers are rewarded appropriately, while high-risk drivers are treated accordingly.

In some embodiments in accordance with aspects of the invention, the route risk value sent (in step 1410) may be in the form of a number rating the risk of the travel route (e.g., a rating of 1 to 100 where 1 is very low risk and 100 is very high risk). Alternatively, the route risk value may be in the form of a predetermined category (e.g., low risk, medium risk, and high risk). At least one benefit of displaying the route risk value in this form is the simplicity of the resulting display for the driver. For example, an enhanced GPS unit may display a route (or segment of a route) in a red color to designate a high risk route, and a route may be displayed in a green color to designate a lower risk route. At least one benefit of a predetermined category for the route risk value is that it may be used as the means for comparing the amount of risk associated with each travel route when providing alternate routes. In addition, the enhanced GPS unit may alert the driver of a high risk road segment and offer the driver an incentive (e.g., monetary incentive, points, etc.) for avoiding that segment.

In accordance with aspects of the invention, a computer-readable medium storing computer-executable instructions for performing the steps depicted in FIG. 10 and/or described in the present disclosure is contemplated. The computer-executable instructions may be configured for execution by a processor (e.g., a processor in personal navigation device 1110) and stored in a memory (e.g., flash memory in device 1110).

When retrieving risk values, in accordance with aspects of the invention, one or more techniques, either alone or in combination, may be used for identifying and calculating the appropriate risk value for road segments. For example, under an accident cost severity rating (ACSR) approach, each point of risk has a value which measures how severe the average accident is for each point of risk. The value may be normalized and/or scaled by adjusting the range of the values. For example, under an ACSR approach using a range of values from 1 to 10: considering all accidents that occur in a predetermined area (e.g., road segment, state, zip code, municipality, etc.), the accidents in the top ten percentile of expensive accidents in that territory would get a 10 value and the lowest 10 percentile of costly accidents in that region would get a 1 value. The actual loss cost may be calculated by summing the various itemized loss costs (e.g., bodily injury, property damage, medical/personal injury protection, collision, comprehensive, uninsured/underinsured motorist, rental reimbursement, towing, etc.).

In an alternate embodiment, the ACSR approach may attribute varying weights to the different types of loss costs summed to calculate the actual loss cost. For example, after analyzing the information, certain portions of a loss cost (e.g., medical cost) may indicate risk more accurately than others. The importance of these portions may be weighted more heavily in the final loss cost calculation. Actuarial methods may be used to adjust loss cost data for a segment where a fluke accident may cause the calculated risk value to far exceed the risk value based on all the other data.

Under the accidents per year (APYR) approach, in accordance with aspects of the invention, each point of risk has a risk value that may reflect the average number of accidents a year for that individual point of risk. Under a modified APYR approach, the risk value for a point of risk continues to reflect the average number of accidents a year, but attributes a lesser weight to accidents that occurred a longer time ago, similar to time relevancy validation (e.g., it gives emphasis to recent accident occurrences over older occurrences).

Under the risk severity (RSR) approach, in accordance with aspects of the invention, each point of risk has a risk value that may reflect the severity of risk for that individual point of risk. For example, an intersection that is a frequent site of vehicle accident related deaths may warrant a very high risk value under the RSR approach. In one embodiment, risk severity rating may be based on accident frequency at intersections or in segments over a determined period of time. In another embodiment, the rating may be based on loss costs associated to intersections and segments. Yet another embodiment may combine accident frequency and severity to form a rating for a segment or intersection. One skilled in the art can recognize that risk severity ratings may be based on one or a combination of factors associated with intersections or segments.

Under the Environmental Risk Variable (ERV) approach, in accordance with aspects of the invention, each point of risk has a risk value that may reflect any or all information that is not derived from recorded accidents and/or claims, but that may be the (direct or indirect) cause of an accident. In one embodiment, the risk value under the ERV approach may be derived from vehicle information transmitted by a data source 1104, 1106. In an alternate embodiment, the EVR approach may use compound variables based on the presence or absence of multiple risk considerations which are known to frequently, or severely, cause accidents. A compound variable is one that accounts for the interactions of multiple risk considerations, whether environmental or derived from recorded accidents and/or claims. For example, driving through a wildlife crossing zone at dusk would generate a greater risk value than driving through this same area at noon. The interaction of time of day and location would be the compound variable. Another example may consider current weather conditions, time of day, day of the year, and topography of the road. A compound variable may be the type of infrequent situation which warrants presenting a verbal warning to a driver (e.g., using a speaker system in a personal navigation device 1110 mounted in a vehicle) of a high risk route (e.g., a high risk road segments).

Another possible approach may be to calculate the route risk value using one or more of the approaches described above divided by the length of the route traveled. This may provide an average route risk value for use in conjunction with a mileage rating plan. In one embodiment, the system combines route risk and conventional mileage data to calculate risk per mile rating.

In one embodiment, a device in a vehicle (e.g., personal navigation device 1110, mobile device 1112, etc.) may record and locally store the route and/or the route and time during which a route was traveled. This travel route information may be uploaded via wireless/wired means (e.g., cell phones, manually using a computer port, etc.). This travel route information may be used to automatically query a data source 1104, 1106 for route rating information and calculate a total risk value.

Some accident data may be recorded and locally stored on a device (e.g., personal navigation device 1110, mobile device 1112, etc.) that provides incident location and a timestamp that can be used to synchronize other data located in data sources 1104 and 1106. The captured information may be periodically uploaded to computing device 1102 for further processing of accident data for updating the road segment database in memory 1116. In some embodiments, the other data may include local weather conditions, vehicle density on the roadway, and traffic signal status. Additional information comprising data from an in-vehicle monitoring system (e.g., event data recorder or onboard diagnostic system) may record operational status of the vehicle at the time of the incident. Alternatively, if the vehicle did not have a location tracking device, an insurance claims reporter may enter the address and other information into the data source manually. If the vehicle was configured with an in-vehicle monitoring system that has IEEE 802.11 Wi-Fi capabilities (or any other wireless communication capabilities), the travel route information may be periodically uploaded or uploaded in real-time (or near real-time) via a computer and/or router. The in-vehicle monitoring system may be configured to automatically upload travel route information (and other information) through a home wireless router to a computer. In some advanced monitoring systems, weather and traffic data (and other useful information) may be downloaded (in real-time or near real-time) to the vehicle. In some embodiments, it may be desirable to use mobile devices 1112 (with the requisite capabilities) to transmit the information, provide GPS coordinates, and stream in data from other sources.

The risk types described above may be variables in a multivariate model of insurance losses, frequencies, severities, and/or pure premiums. Interactions of the variables would also be considered. The coefficient the model produces for each variable (along with the coefficient for any interaction terms) would be the value to apply to each risk type. The personal navigation device 1110 may initially provide the quickest/shortest route from a start location A to an end location B, and then determine the route risk value by determining either the sum product of the number of each risk type and the value for that risk type or the overall product of the number of each risk type and the value for that risk type. (Traffic and weather conditions could either be included or excluded from the determination of the route risk value for comparison of routes. If not included, an adjustment may be made to the route risk value once the route has been traveled). The driver may be presented with an alternate route which is less risky than the initial route calculated. The personal navigation device 1110 may display the difference in risk between the alternate routes and permit the driver to select the preferred route. In some embodiments in accordance with the invention, a driver/vehicle may be provided a monetary benefit (e.g., a credit towards a future insurance policy) for selecting a less risky route.

In one example in accordance with aspects of the invention, a driver may enter a starting location and an end location into a personal navigation device 1110. The personal navigation device 1110 may present the driver with an illustrative 2-mile route that travels on a residential road near the following risks: 5 intersections, 3 past accident sites, 1 railroad crossing, and 1 lane merging site. Assuming for illustrative purposes that the following risk values apply to the following risk types:

| Risk Type | Risk-rating Factor |
|---|---|
| Intersections | 55 |
| Past Accidents | 30 |
| Railroad Crossing | 5 |
| Merge | 60 |
| Residential Road | 2 per mile |

Then, the route risk value for the entire 2-mile route may be calculated, in one embodiment of the invention, as follows:

| Risk Type | Risk-rating Factor | Count | Product |
|---|---|---|---|
| Intersections | 55 | 5 | 55 * 5 = 275 |
| Past Accidents | 30 | 3 | 30 * 3 = 90 |
| Railroad Crossing | 5 | 1 | 5 * 1 = 5 |
| Merge | 60 | 1 | 60 * 1 = 60 |
| Residential Road | 2 per mile | 2 | 2 * 2 = 4 |
| Sum Total | | | 434 |

Assuming a route risk value between 0 and 350 (per mile) is categorized as a low-risk route, then the aforementioned 2-mile route's risk value of 1217 (i.e., 434 divided by 2) classifies it a low-risk route.

In some embodiments, for rating purposes the route risk value may consider the driving information of the driver/vehicle. For example, the personal navigation device 1110 (or other device) may record the route taken, as well as the time of day/month/year, weather conditions, traffic conditions, and the actual speed driven compared to the posted speed limit. The current weather and traffic conditions may be recorded from a data source 1104, 1106. Weather conditions and traffic conditions may be categorized to determine the risk type to apply. The posted speed limits may be included in the geographic information. For each segment of road with a different posted speed limit, the actual speed driven may be compared to the posted speed limit. The difference may be averaged over the entire distance of the route. In addition, various techniques may be used to handle the amount of time stopped in traffic, at traffic lights, etc. One illustrative technique may be to only count the amount of time spent driving over the speed limit and determine the average speed over the speed limit during that time. Another illustrative method may be to exclude from the total amount of time the portion where the vehicle is not moving. Then, upon completion of the trip, the route risk value may be calculated and stored in memory along with the other information related to the route risk score and mileage traveled. This information may later be transmitted to an insurance company's data store, as was described above.

In another embodiment in accordance with aspects of the invention, real time data may be used to dynamically assign risk values to each point of risk. For example, some road segments may have a higher risk value when a vehicle travels through at a time when, e.g., snowfall is heavy. In such situations, a dynamic risk value may be applied to the road segment to determine the appropriate route risk value to assign to the route.

Figure 11:
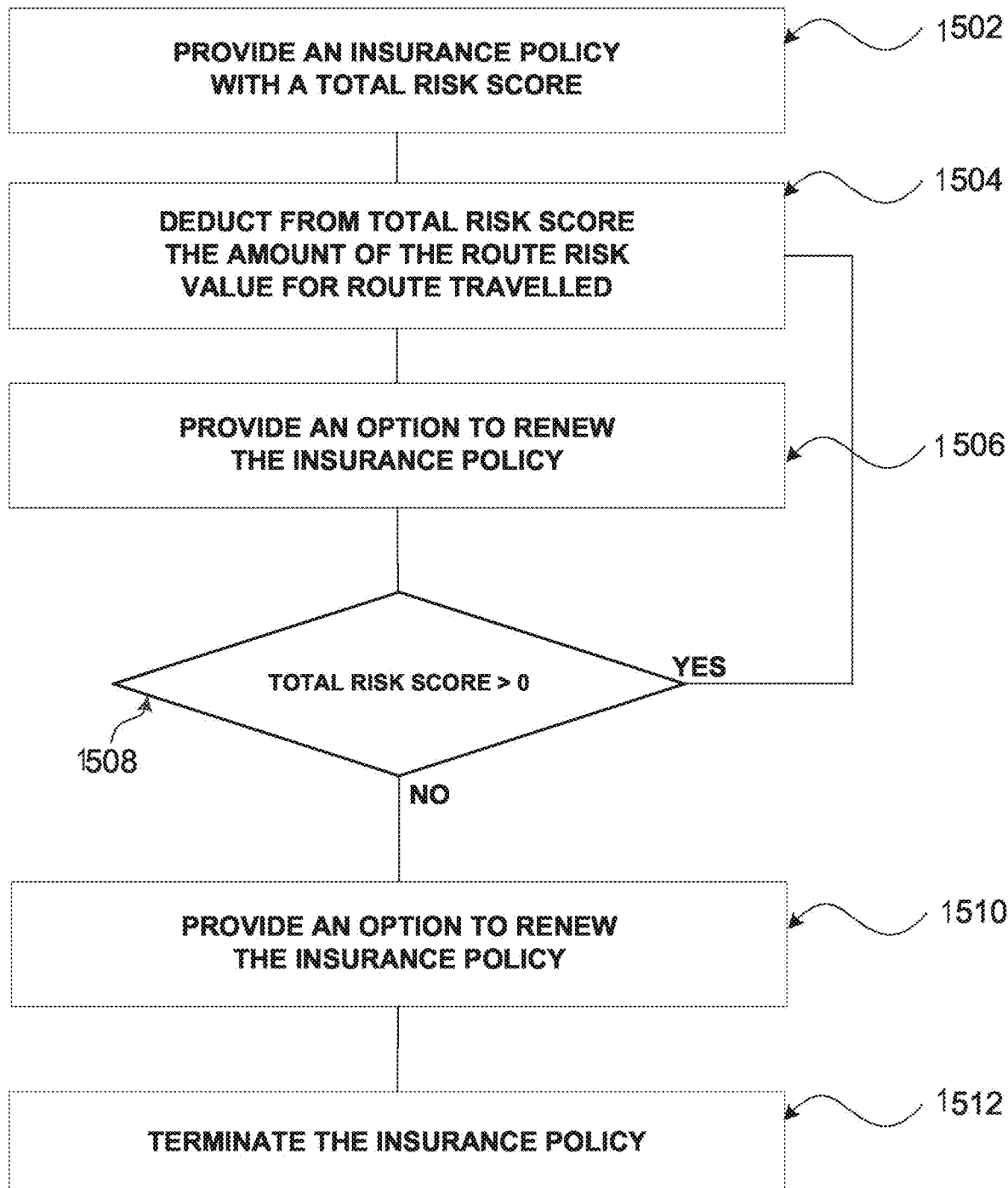
FIG. 11 depicts illustrative steps for providing an insurance policy based on risk consumption in accordance with aspects of the invention.

Referring to FIG. 11, in accordance with aspects of the invention, a method of selling a vehicular insurance policy is illustrated. A vehicle owner or driver may be provided (in step 1502) with an insurance policy with a total risk score. The total risk score (e.g., 1500) indicates the quantity of risk the vehicle is permitted to travel through before the insurance policy must be renewed or becomes terminated. For example, as the vehicle is driven over various travel routes, the route risk values for the road segments traveled are deducted (in step 1504) from the total risk score of the insurance policy. The vehicle owner and/or driver may be provided (in step 1506) an option to renew the insurance policy (e.g., to purchase additional risk points to apply towards the total risk score of the insurance policy). Once the total risk score falls to zero or under (see step 1508), the vehicle owner and/or driver (or any other person/entity authorized to renew the policy) is provided (in step 1510) with a final option to renew the insurance policy before the insurance policy terminates (in step 1512). It will be apparent to one skilled in the art after review of the entirety disclosed that the embodiment illustrated above may benefit from a personal navigation device 1110 (or similar device) to monitor and record the route traveled by a vehicle. At least one benefit of the insurance policy illustrated by FIG. 11 is the ability to pay per quantity of risk consumed instead of paying only a fixed premium.

In another embodiment in accordance with aspects of the invention, route-dependent pricing uses route risk values to adjust insurance pricing based on where a vehicle is driven. Contrary to the embodiment above where the vehicle's insurance policy terminated dependent on the quantity of risk consumed by the vehicle's travel route, in this embodiment, an insurance company (or its representatives, e.g., agent) may adjust the price quoted/charged for an insurance policy based on risk consumed. In this embodiment, a vehicle/driver may be categorized into a risk class (e.g., low-risk, medium-risk, high risk, etc.) and charged for insurance accordingly. For example, the vehicle/driver may be provided with notification of a credit/debit if the vehicle consumed less/more, respectively, of risk at the end of a policy term than was initially purchased.

In another embodiment: the insurance policy is sold and priced in part based on where a customer falls within a three sigma distribution of risk units consumed by all insured per a typical policy period. The policy pricing may be based on an initial assumption of risk to be consumed in the prospective policy period or may be based on risk consumed in a preceding policy period. In a case where the number of risk units consumed is greater than estimated, the customer may be billed for the overage at the end of (or during) the policy period. In yet another embodiment, the system may be provided as a pay-as-you-drive coverage where the customer is charged in part based on the actual risk units consumed in the billing cycle. The system may include a telematics device that monitors, records, and periodically transmits the consumption of risk units to processor 1114 that may automatically bill or deduct the cost from an account.

The foregoing presents a simplified summary of the disclosure in order to provide a basic understanding of some aspects. It is not intended to identify key or critical elements of the invention or to delineate the scope of the invention. Although not required, one of ordinary skill in the art will appreciate that various aspects described herein may be embodied as a method, a data processing system, or as a computer-readable medium storing computer-executable instructions. Accordingly, those aspects may take the form of an entirely hardware embodiment, an entirely software embodiment or an embodiment combining software and hardware aspects. For example, a tangible computer-readable medium (e.g., a CD-ROM, RAM, hard drive, flash memory, etc.) storing instructions to cause a processor to perform methods in accordance with aspects of the disclosure is contemplated.

Numerous trademarks and/or service marks have been used throughout this disclosure. These trademarks and/or service marks are owned by their respective companies.

Aspects of the invention have been described in terms of illustrative embodiments thereof. Numerous other embodiments, modifications and variations within the scope and spirit of the disclosed invention will occur to persons of ordinary skill in the art from a review of this entire disclosure. For example, one of ordinary skill in the art will appreciate that the steps illustrated in the illustrative figures may be performed in other than the recited order, and that one or more steps illustrated may be optional in accordance with aspects of the disclosure.

We claim:

1. An apparatus, comprising:
    a communications interface in communication with a computing device of a vehicle;
    a mobile device processor for executing computer-executable instructions;
    a second memory device storing computer-executable instructions that when executed by the mobile device processor cause the apparatus to perform steps comprising:
        after occurrence of a roadside event to the vehicle, receiving input data at the apparatus related to an electronic membership card;
        retrieving membership information associated with the vehicle;
        receiving, through the communications interface with the vehicle, a vehicle diagnostic datum from the vehicle;
        accessing a data structure located at a first memory device based on the received vehicle diagnostic datum to obtain a translated diagnostic code for the vehicle;
        identifying a roadside assistance service type from a plurality of roadside assistance service types based on at least the translated diagnostic code; and
        sending, to a remote server, a request including the membership information and the identified roadside assistance service type.

2. The apparatus of claim 1, further comprising:
    the second memory device storing computer-executable instructions that when executed by the mobile device processor cause the apparatus to perform steps further comprising:
        displaying, by the apparatus, the electronic membership card.

3. The apparatus of claim 2, wherein the second memory device storing computer-executable instructions that when executed by the mobile device processor cause the apparatus to perform steps further comprising:
    updating, by the apparatus, the electronic membership card with the membership information; and
    displaying the updated electronic membership card.

4. The apparatus of claim 1, further comprising:
    the second memory device storing computer-executable instructions that when executed by the mobile device processor cause the apparatus to perform steps further comprising:
        after the occurrence of the roadside event, displaying at least one roadside assistance service type available to the vehicle; and
        confirming the identified roadside assistance service type.

5. The apparatus of claim 1, wherein the vehicle diagnostic datum is indicative that at least one vehicle parameter is outside of normal operating limits.

6. The apparatus of claim 5, wherein the second memory device storing computer-executable instructions that when executed by the mobile device processor cause the apparatus to perform steps further comprising:
    registering on the remote server to have updates from a third-party server;
    reporting the vehicle diagnostic datum; and
    receiving a notification from the third-party server in response to the vehicle diagnostic datum.

7. The apparatus of claim 6, wherein the notification from the third-part server is routed through the remote server.

8. The apparatus of claim 1, wherein the second memory device storing computer-executable instructions that when executed by the mobile device processor cause the apparatus to perform steps further comprising:
    receiving service information about each of a plurality of service providers qualified to handle the identified roadside assistance service type;
    displaying the service information;
    receiving a selection about a selected service provider; and
    sending a response to the remote server, wherein the response includes an indication of the selected service provider.

9. The apparatus of claim 8, wherein the service information includes a performance metric for each of the plurality of service providers.

10. The apparatus of claim 1, wherein the electronic membership card is characterized by a membership level and wherein the second memory device storing computer-executable instructions that when executed by the mobile device processor cause the apparatus to perform steps further comprising:
    restricting the plurality of roadside assistance service types based on the membership level.

11. A method comprising:
    after occurrence of a roadside event to a vehicle, receiving input data at a related to an electronic membership card, the roadside event being one of a plurality of event types, the plurality of event types comprising:
        a low battery;

out of fuel;
a flat tire;
lock out;
an accident; and
towing request;

retrieving membership information associated with the vehicle;

receiving, through a communications interface from a computing device, a service indicator indicative of a determined roadside assistance service type, wherein the determined roadside assistance service type applies to the roadside event to the vehicle; and sending, to a remote server, a request having the membership information and the determined roadside assistance service type.

12. The method of claim 11, further comprising:

receiving, through the communications interface from the computing device, a vehicle diagnostic datum for the vehicle.

13. The method of claim 12, further comprising:

registering on the remote server to have updates from a third-party server; and receiving a notification, from the third-party server through the remote server, in response to the vehicle diagnostic datum that is indicative the at least one vehicle parameter is outside of normal operating limits.

14. The method of claim 11, further comprising:

updating the electronic membership card with the membership information; and displaying the updated electronic membership card.

15. The method of claim 14, further comprising:

receiving service information about each of a plurality of service providers qualified to handle the determined roadside assistance service type;

displaying the service information;

receiving a selection about a selected service provider; and sending a response, to the remote server, wherein the response includes an indication of the selected service provider.

16. The method of claim 15, wherein the service information includes a performance metric for each of the plurality of service providers.

17. A non-transitory computer-readable medium storing computer-executable instruction that, when executed by a processor, cause an apparatus to perform:

after occurrence of a roadside event to a vehicle, receiving input data related to an electronic membership card;

retrieving membership information associated with the vehicle;

receiving, through a communications interface, a vehicle diagnostic datum for the vehicle;

sending, to a remote server, a request having the membership information and the vehicle diagnostic datum;

receiving from the remote server, a response having a determined roadside assistance service type based on the vehicle diagnostic datum.

18. The non-transitory computer-readable medium of claim 17, the computer-readable medium storing computer-executable instructions that, when executed by a processor, further cause the apparatus to perform:

receiving service information about each of a plurality of service providers qualified to handle the determined roadside assistance service type;

displaying the service information;

receiving a selection about a selected service provider; and sending a response to the remote server, wherein the response includes an indication of the selected service provider.

19. The non-transitory computer-readable medium of claim 17, the computer-readable medium storing computer-executable instructions that, when executed by a processor, further cause the apparatus to perform:

receiving, through the communications interface, a vehicle diagnostic datum for the vehicle;

registering on the remote server to have updates from a third-party server; and receiving a notification, from the third-party server through the remote server based on the vehicle diagnostic datum, indicative that at least one vehicle parameter is outside of normal operating limits.

20. The non-transitory computer-readable medium of claim 17, the computer-readable medium storing computer-executable instructions that, when executed by a processor, further cause the apparatus to perform:

updating the electronic membership card with the membership information; and rendering the updated electronic membership card for display.

* * * * *